United States Patent
Nakamura et al.

(10) Patent No.: US 8,295,139 B2
(45) Date of Patent: Oct. 23, 2012

(54) METHOD AND DEVICE FOR OPTICAL RECORDING ONTO OPTICAL DISC MEDIUM

(75) Inventors: Atsushi Nakamura, Osaka (JP); Naoyasu Miyagawa, Hyo Go (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/094,220

(22) Filed: Apr. 26, 2011

(65) Prior Publication Data

US 2011/0199877 A1 Aug. 18, 2011

Related U.S. Application Data

(62) Division of application No. 10/583,320, filed as application No. PCT/JP2005/000065 on Jan. 6, 2005.

(30) Foreign Application Priority Data

Jan. 9, 2004 (JP) .................................. 2004-003920

(51) Int. Cl.
G11B 7/00 (2006.01)

(52) U.S. Cl. ............... 369/59.12; 369/59.11; 369/59.23; 369/47.5; 369/116

(58) Field of Classification Search .................. None
See application file for complete search history.

(56) References Cited

U.S. PATENT DOCUMENTS

| | | | |
|---|---|---|---|
| 5,490,126 A | 2/1996 | Furumiya et al. | |
| 6,157,609 A | 12/2000 | Shoji et al. | |
| 6,181,654 B1 | 1/2001 | Shoji et al. | |
| 6,426,930 B2 | 7/2002 | Tanaka et al. | |
| 6,510,116 B1 | 1/2003 | Miyagawa et al. | |
| 6,631,110 B1 | 10/2003 | Seo et al. | |
| 6,762,986 B1 | 7/2004 | Seo | |
| 6,894,965 B2 | 5/2005 | Furumiya et al. | |
| 7,362,684 B2 | 4/2008 | Kobayashi | |
| 2002/0067669 A1 | 6/2002 | Maeda et al. | |
| 2004/0100885 A1 | 5/2004 | Nakamura et al. | |
| 2005/0058047 A1 | 3/2005 | Fujita et al. | |

FOREIGN PATENT DOCUMENTS

EP 0 977 184 2/2000
(Continued)

OTHER PUBLICATIONS

European Office Action issued Mar. 26, 2009 in corresponding European patent application No. 05-703333.4.

(Continued)

*Primary Examiner* — Muhammad N Edun
(74) *Attorney, Agent, or Firm* — Wenderoth, Lind & Ponack, L.L.P.

(57) ABSTRACT

There is provided an optical recording method for directing a recording pulse train to an optical disc medium to form marks thereon and for recording information as information about the edge positions of said marks and the spaces between marks, the recording pulse train having been created by modulating laser light into plural power levels. The method includes: coding to-be-recorded data into coded data consisting of the combination of marks and spaces; classifying said marks within said coded data on the basis of the mark length and the preceding or succeeding space lengths of the marks; shifting the position of the second pulse edge counted from the end portion of the recording pulse train for forming said marks, depending on the result of said classification, to adjust said recording pulse train; and directing said recording pulse train to the optical disc medium to form said marks thereon.

3 Claims, 13 Drawing Sheets

FOREIGN PATENT DOCUMENTS

| | | |
|---|---|---|
| EP | 1 170 731 | 1/2002 |
| EP | 1 498 884 | 1/2005 |
| JP | 2679596 | 11/1997 |
| JP | 2000-48362 | 2/2000 |
| JP | 2000-348349 | 12/2000 |
| JP | 2004-185796 | 7/2004 |
| JP | 2005-92942 | 4/2005 |
| KR | 10-2002-0091259 | 5/2002 |

OTHER PUBLICATIONS

European Office Action issued Apr. 7, 2010 in corresponding European patent application No. 05-703333.4.
International Search Report issued Apr. 26, 2005 in International Application No. PCT/JP2005/000065.

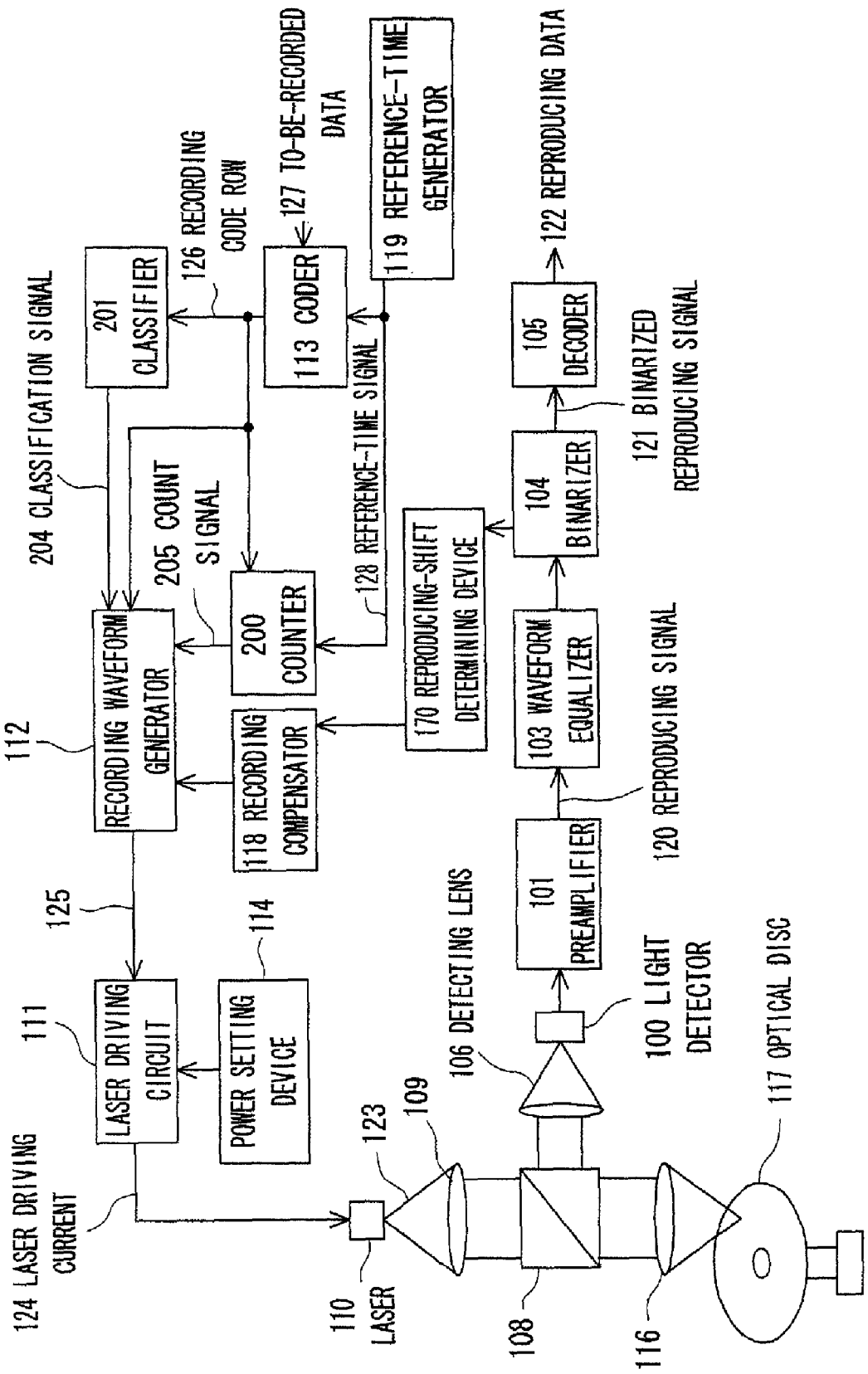

128 REFERENCE-TIME SIGNAL

126 RECORDING CODE ROW

300 MARK ARRAY

205 COUNT SIGNAL

204 CLASSIFICATION SIGNAL

125 RECORDING PULSE SIGNAL

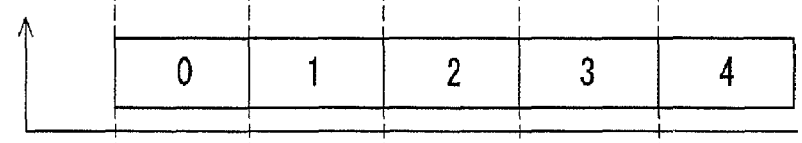
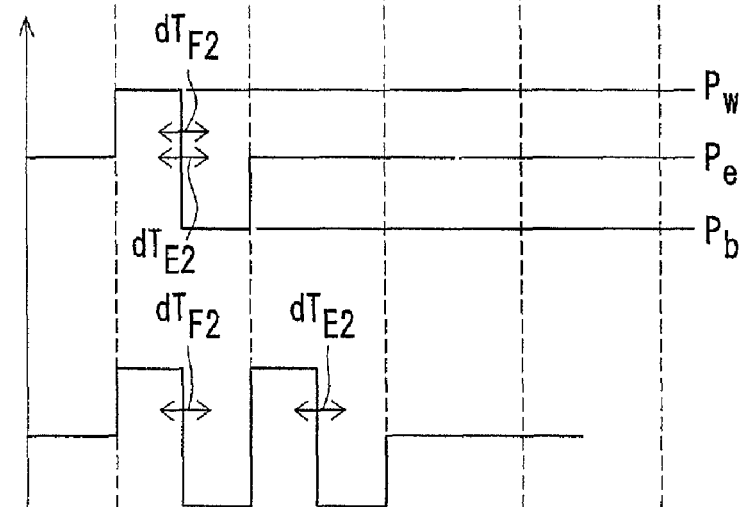
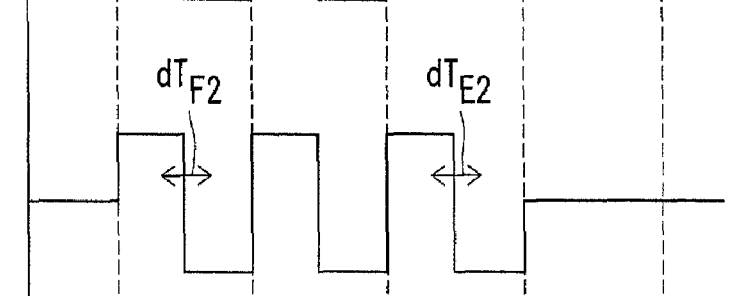
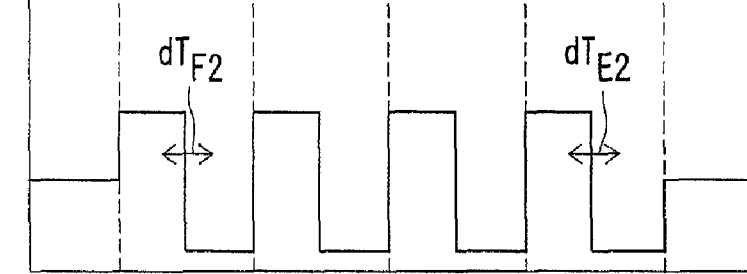
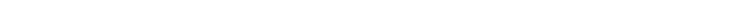

128 REFERENCE-TIME SIGNAL

205 COUNT SIGNAL $2T_m$ $3T_m$ $4T_m$ $5T_m$

128 REFERENCE-TIME SIGNAL

205 COUNT SIGNAL

900  $2T_W$

901  $3T_W$

902  $4T_W$

903  $5T_W$

904  $6T_W$

905  $7T_W$

906  $8T_W$

907  $9T_W$

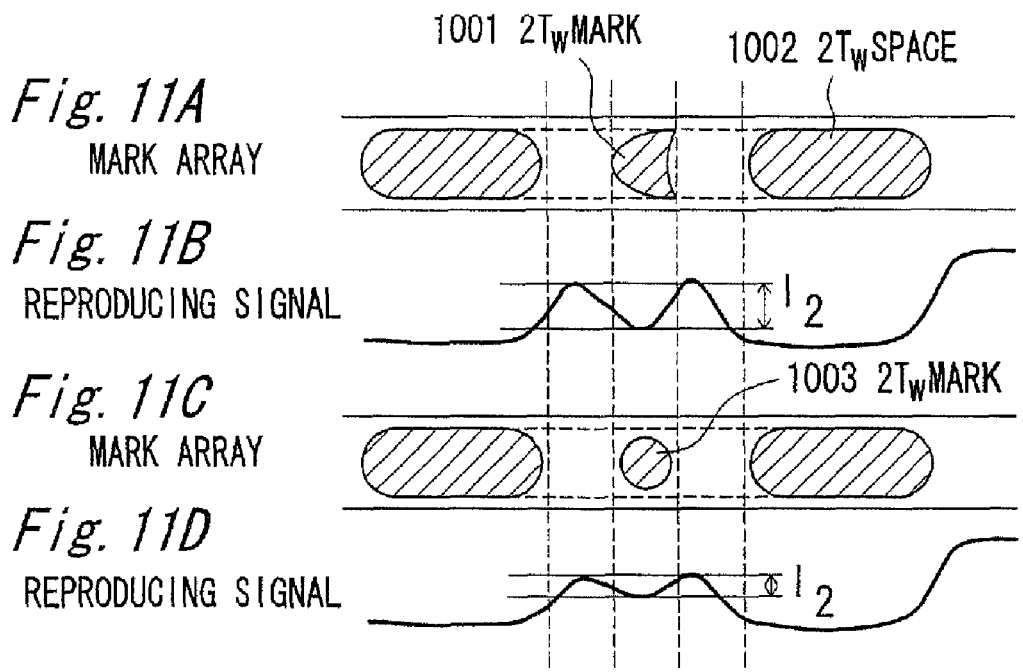
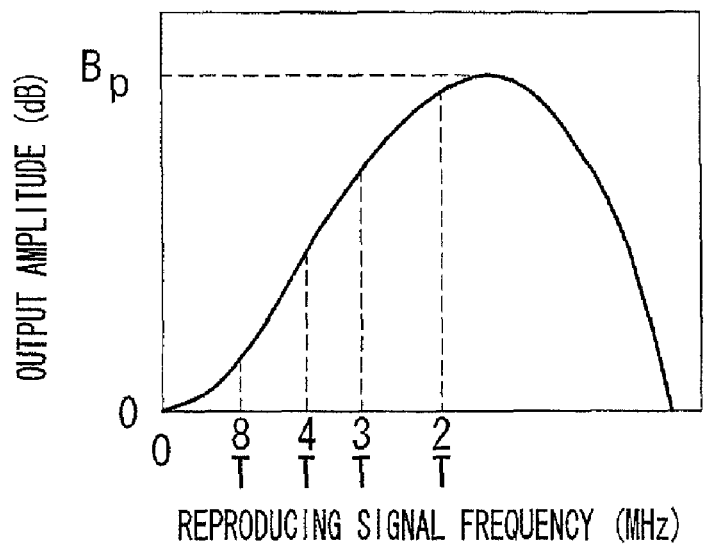

128 REFERENCE-TIME SIGNAL

126 RECORDING CODE ROW

300 MARK ARRAY

205 COUNT SIGNAL

303 EXEMPLARY RECORDING WAVEFORMS IN A PRIOR-ART APPARATUS

128 REFERENCE-TIME SIGNAL

205 COUNT SIGNAL $2T_m$ $3T_m$ $4T_m$ $5T_m$

METHOD AND DEVICE FOR OPTICAL RECORDING ONTO OPTICAL DISC MEDIUM

This application is a Divisional Application of Ser. No. 10/583,320, which is the National Stage of International Application No. PCT/JP2005/000065 filed Jan. 6, 2005.

TECHNICAL FIELD

The present invention relates to optical recording methods and optical recording apparatuses for recording information onto an optical disc medium by directing laser light thereto to form marks thereon.

BACKGROUND ART

Optical discs such as DVD-RAMS are phase-change discs including amorphous marks which have been formed on the recording film by directing laser light thereto and controlling the laser power during heating for changing the cooling ratio of the recording film. In order to increase the information transfer rate during recording and reproducing onto and from these optical disc mediums, the recording linear density may be increased or the scanning speed of a light spot over the recording medium can be increased. In order to increase the recording linear density, mark lengths and space lengths themselves may be reduced or mark lengths and space lengths may be varied minutely to reduce the time intervals of detection of mark edge positions. However, the method of increasing the recording linear density will cause the problem of the S/N ratio of reproducing signals, thus making it impossible to largely increase the recording linear density.

In the case of reducing the lengths of to-be-recorded marks and spaces in order to increase the recording density, particularly if the space lengths are made small, this will cause heat interferences, that is, heat of the ending end portion of a recorded mark may be transferred through the space region to affect the temperature rise at the starting end portion of the next mark or heat of the starting end portion of a recorded mark may affect the cooling process at the ending end portion of the previously-formed mark. Prior-art recording methods have had the problem that the occurrence of heat interferences causes fluctuations of mark edge positions thereby increasing the error ratio during reproduction.

Furthermore, even when marks and spaces are formed on a disc to have accurate lengths, there may be caused the problem that the detected edge positions of short marks and spaces are deviated from ideal values during reproduction, due to the frequency characteristics of the reproducing optical system which depend on the size of the light spot. Such deviations of detected edges from the ideal values are generally referred to as inter-code interferences. There has been the problem that when the sizes of marks and spaces are smaller than the light spot, significant inter-code interferences are caused to increase jitter during reproduction, thus increasing the error ratio.

Therefore, there have been disclosed methods which drive laser power with binary values and change the positions of the starting end portions of marks depending on the mark lengths and the preceding space lengths of to-be-recorded marks while changing the positions of the ending end portions of marks depending on the mark lengths and the succeeding space lengths of to-be-recorded marks, as shown in Japanese Patent Publication No. 2679596. Thus, the methods compensate the occurrences of heat interferences between marks during high-density recording and inter-code interferences due to the frequency characteristics during reproduction.

Further, there have been disclosed methods which drive laser power with three or more values and change the positions of the starting end portions of marks depending on the mark lengths of to-be-recorded marks while changing the positions of the ending end portions of marks depending on the mark lengths of to-be-recorded marks during recording, as shown in Japanese Patent Laid-open Publication No. 2004-185796. Thus, the methods compensate the occurrences of heat interferences between marks during high-density recording and inter-code interferences due to the frequency characteristics during reproduction There is also disclosed a method of adjusting the ending end positions of marks by changing the widths of cooling pulses, in such cases.

FIGS. 13A to 13D and 13F are views illustrating examples of marks and spaces in a recording code row and the recording waveform generating operation for recording them, in a prior-art apparatus.

FIG. 13A represents reference-time signals 128 having a period of Tw, which serve as a time reference for the recording operation. FIG. 13B represents a recording code row 126 resulted from the NRZI conversion of to-be-recorded data by the coder 113. Here, the Tw is also a detecting window width and is a standard unit of mark lengths and space lengths in the recording code row 126. FIG. 13C represents an image of marks and spaces to be actually recorded on the optical disc and the laser light spot is scanned in a direction from left to right in FIG. 13C. Marks 301 correspond to the "1" level of the recording code row 126 with a one-to-one ratio and are formed to have lengths corresponding to the durations thereof. FIG. 13D represents count signals 205 for measuring the time elapsed since the heads of the marks 301 and the spaces 302 by using the Tw as a unit.

FIG. 13F is an example of recording waveforms in a prior-art apparatus corresponding to the recording code row of FIG. 13B. The recording waveforms 303 are created by referring to the count signals 205 and the recording code row 126.

FIGS. 14A to 14F are views illustrating examples of marks and spaces in a recording code row and the recording waveform generating operation for recording them, in a prior-art apparatus. FIG. 14A represents reference-time signals 128 having a period of Tw, which serve as a time reference for the recording operation. FIG. 14B represents a recording code row 126 resulted from the NRZI conversion of to-be-recorded data by the coder 113. Here, the Tw is also a detecting window width and is a standard unit of mark lengths and space lengths in the recording code row 126. FIGS. 14C to 14F are timing charts illustrating the waveforms of recording pulse signals 125 during the formation of recording marks having mark lengths of 2 T to 5 T. The recording pulse signals 125 have been subjected to level modulation to have three levels which are a highest-level peak power (Pw), a medium-level erasing power (Pe) and a lowest-level bottom power (Pb) in the case of FIG. 14C.

With the prior-art recording compensation, the amount of shift $dT_{top}$ by which the starting position of each head pulse is shifted from the reference-time signals is changed depending on the mark length of the to-be-recorded mark as described above, to change the starting end position of the recorded mark. Further, the amount of shift dTe by which the ending position of the cooling pulse is shifted from the reference-time signals is changed depending on the mark length of the to-be-recorded mark to change the ending end position of the recorded mark.

With the aforementioned first prior-art technique, the power is modulated with binary values. Therefore, in the case of performing multi-pulse recording onto a medium such as a phase-change type disc which enables controlling the formation of marks with the cooling rate of heated portions, the next light pulses are directed thereto before the heated portions are sufficiently cooled, which prevents normal mark formation. Namely, there has been the problem that marks are formed to be teardrop shapes and thus normal marks cannot be formed due to excessive amounts of heat injection.

Further, when minute marks have been formed during the mark forming process, marks having minimum mark lengths cause significant inter-code interferences. To cope with this, in order to correct the frequency characteristics of the reproducing optical system, an electrical frequency correcting circuit (equalizer) may be used to reduce the inter-code interferences. However, the boost value of the equalizer is increased especially during the formation of minute marks. When the inter-code interferences in the reproducing system are eliminated by increasing the boost value of the equalizer, noise components in high-frequency regions are increased, thus making it impossible to provide preferable jitter.

Further, with the aforementioned second prior-art technique, the ending end positions of cooling pulses are adjusted during compensation of mark ending edges for facilitating recrystallization of the ending end portions of the mark to adjust the positions of ending end portions of the to-be-recorded mark.

However, in the case of a rerecordable-type optical recording medium employing an inorganic material, the formation of marks have irreversible characteristics and thus includes no recrystallization process of the recording film, which makes it impossible to adjust mark ending end positions by adjusting the widths of cooling pulses, in some mediums. In the case of such mediums, jitter at the mark ending end positions will be increased, thus causing increases of the error ratio of reproducing signals.

As described above, the aforementioned prior-art techniques cannot enable the formation of marks with sufficient accuracy during high-density recording and consequently cannot realize sufficient recording surface densities and sufficient reliability.

Therefore, it is an object of the present invention to provide optical recording methods and optical recording apparatuses which are capable of recording onto various types of optical disc mediums while accurately compensating heat interferences and inter-code interferences.

SUMMARY OF THE INVENTION

An optical recording method according to the present invention is an optical recording method for directing a recording pulse train to an optical disc medium to form marks thereon and for recording information as information about the edge positions of the aforementioned marks and the spaces between marks, the recording pulse train having been created by modulating laser light into plural power levels, wherein the method includes:

coding to-be-recorded data into coded data consisting of the combination of marks and spaces;

classifying the aforementioned marks within the aforementioned coded data on the basis of the mark length and the preceding or succeeding space lengths of the marks;

shifting the position of the second pulse edge counted from the end portion of the recording pulse train for forming the aforementioned marks, depending on the result of the aforementioned classification, to adjust the aforementioned recording pulse train; and directing the aforementioned recording pulse train to the optical disc medium to form the aforementioned marks thereon.

An optical recording apparatus according to the present invention is an optical recording apparatus for directing a recording pulse train to an optical disc medium to form marks thereon and for recording information as information about the edge positions of the aforementioned marks and the spaces between marks, the recording pulse train having been created by modulating laser light into plural power levels, wherein the apparatus includes:

coding unit operable to code to-be-recorded data into coded data consisting of the combination of marks and spaces;

classifying unit operable to classify the aforementioned marks within the aforementioned coded data on the basis of the combination of the mark length and the preceding or succeeding space lengths;

recording wave generator operable to create a recording pulse train for creating the aforementioned marks in which the position of the second pulse edge counted from the end portion thereof has been shifted depending on the result of the aforementioned classification; and laser driving unit operable to direct the aforementioned recording pulse train to the optical disc medium to form the aforementioned marks thereon.

As described above, with the optical recording method according to the present invention, marks to be recorded are classified by mark length and preceding or succeeding space lengths and the position of the second pulse edge counted from the end portion of a recording pulse train for recording each mark is shifted by an amount of edge shift $dT_{F2}$ and/or $dT_{E2}$ depending on the result of the aforementioned classification to adjust the recording pulse signals. This enables accurately controlling the starting end position and the ending end position of the mark to be formed on the optical disc medium. Further, the pulse edge is adjusted depending on the preceding or succeeding space lengths as well as on the mark length of the to-be-recorded mark, thus controlling the starting end position and the ending end position of the mark more accurately in consideration of inter-code interferences. This can improve the reliability of the recording/reproducing operation and realize miniaturization of the information recording apparatus and the recording medium at the same time.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 1 is a block diagram illustrating the structure of an optical recording apparatus according to a first embodiment of the present invention;

FIGS. 3A to 3F are timing charts illustrating the relationship between the mark lengths and the recording waveforms of recording pulse trains, in the optical recording method according to the first embodiment of the present invention;

FIGS. 11A to 11D are schematic views illustrating the waveforms of reproducing signals in a reproducing method according to a fourth embodiment of the present invention;

FIG. 12 is a view illustrating the waveform equalizing characteristics in the reproducing method according to a fourth embodiment of the present invention;

DESCRIPTION OF THE PREFERRED EMBODIMENTS

Figure 2A:
FIGS. 2A to 2F are timing charts in the optical recording method according to the first embodiment of the present invention.

Hereinafter, embodiments of the present invention will be described. While in these embodiments phase-change optical discs will be exemplified as recording media, the present invention is not limited thereto and is techniques common to recording mediums which enable recording information therein by injecting energy thereto to form marks having physical characteristics different from those of non-recorded portion.

(First Embodiment)

FIG. 1 is a block diagram illustrating the structure of an optical recording/reproducing apparatus according to the first embodiment of the present invention. This optical recording/reproducing apparatus includes, as a recording system, a coder 113, a reference-time generator 119, a counter 200, a classifier 201, a recording waveform generator 112, a recording compensator 118, a laser driving circuit 111, a power setting device 114, a laser 100 and an optical system including an objective lens 116. Further, this optical recording/reproducing device includes, as a reproducing system, the optical system including a detecting lens 106, a light detector 100, a preamplifier 101, a waveform equalizer 103, a binarizer 104, a decoder 105, and a reproducing-shift determining device 170. Further, the aforementioned optical system includes a collimating lens 109 and a half mirror 108, in addition to the objective lens 116 and the detecting lens 106.

First, the respective components of the optical recording/reproducing device will be described.

The coder 113 converts to-be-recorded data 127 into a recording code row (NRZI) 126 which is information about the mark lengths, the space lengths and the positions of the heads of marks and spaces to be formed on an optical disc 117. The recording code row 126 is transferred to the classifier 201, the recording waveform generator 112 and the counter 200.

The classifier 201 classifies the marks within the recording code row 126, by mark length (code length) and preceding or succeeding space lengths, in accordance with a predetermined rule. The classifier 201 inputs the result, as classification signals 204, to the recording waveform generator 112.

The counter 200 refers to the recording code row 126, measures the time elapsed since the positions of the heads of marks using reference-time signals 128 generated from the reference-time generator 119 as the unit and creates count signals 205. The coder 113 and the recording waveform generator 112 are operated in synchronization with the reference-time signals 128. The reference-time signals 128 are created by reading signals from wobbles on the disc 117 and applying a PLL thereto for establishing synchronization thereof.

The recording compensator 118 reads information pre-recorded on a certain region of the disc, holds recording compensating table data and outputs the recording compensating table data to the recording waveform generator, wherein the recording compensating table data defines the amounts of pulse-position shifts by which the recording pulse waveforms are to be shifted by the recording waveform generator in accordance with the mark lengths and the preceding or succeeding space lengths.

The recording waveform generator 112 compensates, along a time axis, pulse-shaped waveforms in accordance with NRZI rows, classification signals and the recording compensating table data. Thus, the NRZI rows are converted into recording pulse signals 125 corresponding to recording waveforms. Recording pulse signals 125 are formed by three levels depending on the laser power level.

The recording compensator 118 stores a recording compensating table defining the amounts of edge shifts $dT_{F2}$ and/or $dT_{E2}$ by which the position of the second pulse edge counted from the end portion of the recording pulse signal 125 is shifted, as will be described later. The recording compensator 118 sends the recording compensating table to the recording waveform generator 112 and causes it to send, to the laser driving circuit, recording pulse signals 125 including recording pulses, wherein the positions and the widths of the respective recording pulses have been compensated by classifying the pulses for respective mark lengths on the basis of the classification signals.

The laser driving circuit 111 sets the laser powers corresponding to the three levels (Pw, Pe, Pb) of recording pulse signals 125 to the power levels set by the power setting device 114 and drives the laser 110 with a laser driving current 124 for directing pulse-shaped light to the optical disc 117 to create recording marks thereon.

Next, there will be described a method for recording information onto an optical disc 117 with the recording system of the optical recording/reproducing apparatus.

Recording pulse signals 125 are sent to the laser driving circuit 111. The laser driving circuit 111 refers to the recording pulse signals 125 and the powers set by the power setting device 114 and generates laser driving currents 124 according to the levels of the recording pulse signals 125 for causing the laser 110 to generate light in accordance with predetermined recording waveforms of the recording pulse signals 125. The laser light 123 generated from the laser 110 is focused onto the optical disc 117 through the collimating lens 109, the half mirror 108 and the objective lens 116 and heats the recording film to form marks and spaces.

Next, there will be described a reproducing method executed in the reproducing system of the optical recording/reproducing apparatus.

During reproduction of information, laser light 123 at a low power level which will not corrupt recorded marks is scanned over the mark row on the optical disc 117. The reflected light from the optical disc 117 is passed through the objective lens 116 and the half mirror 108 and is directed to the detecting lens 106. The laser light is passed through the detecting lens 106 and is focused onto the light detector 100. The focused light is converted into electric signals depending on the strength of the light-intensity distribution on the light detector 100. The preamplifier 101 provided on the light detector 100 amplifies the electrical signals into reproducing signals 120 in accordance with the presence and absence of marks at the scanned position on the optical disc 117. The waveform equalizer 103 applies a waveform equalizing process to the reproducing signals 120 and the binarizer 104 changes them to binary data consisting of "0" or "1" and then applies a PLL to the data for establishing synchronization thereof to convert it into binarized reproducing signals 121. The decoder 105 applies conversion inverse to that of the coder 113 to the binarized reproducing signals 121 to create reproducing data 122.

The reference-time signals have a frequency of 66 MHz and a Tw of about 15 nsec, for example. The disc is rotated at a constant linear speed of 4.92 m/sec. As the laser light, a semiconductor laser with a wavelength of 405 nm is employed. The objective lens has an NA of 0.85. The optical disc 117 may be a single-layer disc including a single layer which has a recording surface capable of recording information thereon or a double-layer disc including two layers provided at one side, each layer having a recording surface capable of recording information thereon. Also, the optical disc medium 117 may be either a rewritable-type optical disc medium employing a phase-change recording material or a write-once type optical disc medium capable of recording only a single time. The manner of coding may be 17PP modulation or 8-16 modulation, as well as (1,7) modulation. In the case of (1,7) modulation and 17PP modulation, the smallest code length will be 2 Tw. In the case of 8-16 modulation, the smallest code length will be 3 Tw, which may be treated as a code length provided by the present embodiment employing (1,7) modulation plus one.

FIGS. 2A to 2F are views illustrating examples of marks and spaces in a recording code row and the recording waveform generating operation for recording them, in the optical recording/reproducing apparatus.

Figure 2B:
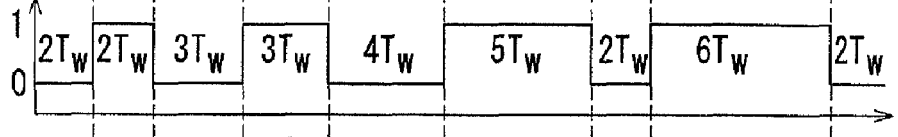
Figure 2C:
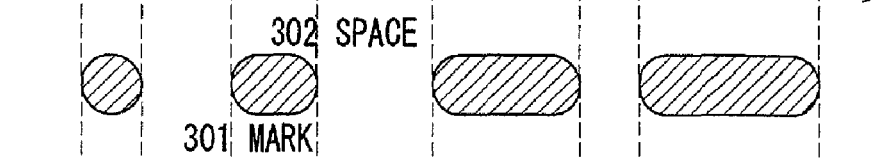
Figure 2D:
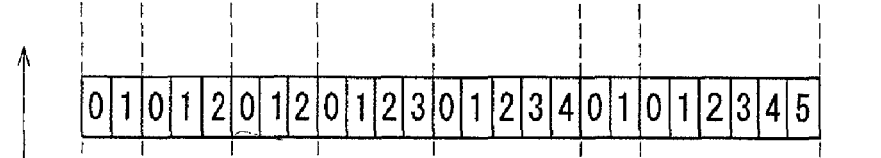

FIG. 2A represents reference-time signals 128 having a period of Tw, which serve as a time reference for the recording operation. FIG. 2B represents a recording code row 126 resulted from the NRZI conversion of to-be-recorded data by the coder 113. Here, the Tw is a detecting window width and is a minimum unit of the amount of the changes of mark lengths and space lengths in the recording code row 126. FIG. 2C represents an image of marks and spaces to be actually recorded on the optical disc and the laser light spot is scanned in a direction from left to right in FIG. 2C. Marks 301 correspond to the "1" level of the recording code row 126 with a one-to-one ratio and are formed to have lengths corresponding to the durations thereof. FIG. 2D represents count signals 205 for measuring the time elapsed since the heads of the marks 301 and the spaces 302 by using the Tw as a unit.

Figure 2E:
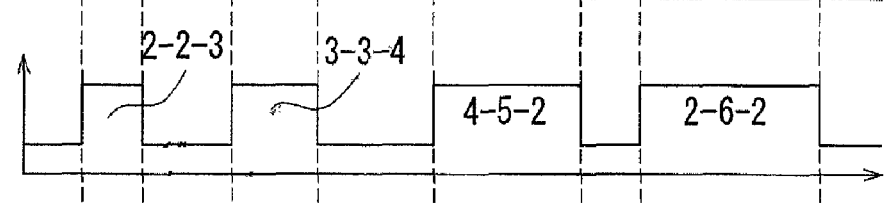

FIG. 2E is a schematic view of the classification signals 204 in the recording/reproducing apparatus, wherein the marks are classified by the combination of three values which are the mark length and the preceding or succeeding space lengths of each mark, in the present embodiment. For example, in FIG. 2E, "4-5-2" represents a mark having a mark length of 5 Tw, a preceding space length of 4 Tw and a succeeding mark length of 2 Tw. Also, in some cases, w may be omitted and the respective lengths may be represented as 4 T and 2 T. Also, in some cases, the space lengths may be represented as 4 Ts while the mark length is represented as 2 Tm.

Figure 2F:
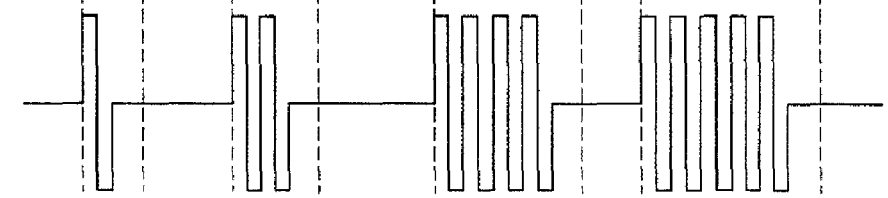

FIG. 2F represents recording pulse signals corresponding to the recording code row 126 of FIG. 2B, as an example of light waveforms to be actually recorded. These recording pulse signals 125 are created by referring to the count signals 205, the recording code row 126, the classification signals 204 and the recording compensating table data output from the recording compensator 118.

Then, there will be described a recording compensating method in the optical recording/reproducing apparatus.

FIGS. 3A to 3F are schematic views illustrating the relationship between the mark lengths of marks and the recording waveforms of the recording pulse signals 125. FIG. 3A represents reference-time signals 128 having a period of Tw, which serve as a time reference for the recording operation. FIG. 3B represents count signals 205 generated from the counter 200 for measuring the time elapsed since the mark heads using the reference time Tw of the reference-time signals 128 as the unit. The timing of the transition of the count signal to 0 corresponds to the heads of marks or spaces. FIGS. 3C to 3F are recording pulse signals 125 during the formation of recording marks. The recording pulse signals 125 have been subjected to level modulation to have three levels which are a highest-level peak power (Pw), a medium-level erasing power (Pe) and a lowest-level bottom power (Pb). Further, after the last pulse, a cooling pulse is formed at the bottom power level.

Although the recording pulse signals 125 have been subjected to modulation to have three power level values, recording pulse signals may be subjected to modulation to have a total of four power levels such that the bottom power level of the cooling pulse after the last pulse is different from the bottom power level between middle pulses. Although, in FIGS. 3A to 3F, the bottom power level is a power level lower than the erasing power level, the bottom power level may be an intermediate power level between the erasing power level and peak power level. Although in FIGS. 3C to 3F the recording pulse signal for a 4 Tw-mark includes a single middle pulse, the number of middle pulses increases one by one as the mark length (code length) increases 1 Tw by 1 Tw to 5 Tw or 6 Tw.

According to this recording compensation (adaptive compensation), marks are classified by mark length and preceding or succeeding spaces, and the position of the second-pulse edge counted from the end portion of the recording pulse train for recording the respective marks by an amount of edge shift $dT_{F2}$ or/and $dT_{E2}$ according to the aforementioned result of classification to control the recording pulse signal, thus accurately controlling the starting end position and the ending end position of the marks to be formed on the optical disc medium. When the positions of the starting end portions $dT_{top}$ and the ending end portions dTe of recording pulse trains are shifted as in the prior art, the starting end positions and the ending end positions of marks are largely shifted, thus preventing accurate control. By shifting the position of the second-pulse edge counted from the end portion of the recording pulse signal by an amount of edge shift $dT_{F2}$ or/and $dT_{E2}$ as previously described, the starting end position and the ending end position of the mark can be controlled more accurately. Further, the pulse edges are controlled depending on the preceding or succeeding space lengths as well as on the mark lengths of marks to be recorded, thus controlling the starting end positions and the ending end positions of the marks more accurately in consideration of interference between codes.

Figure 7:
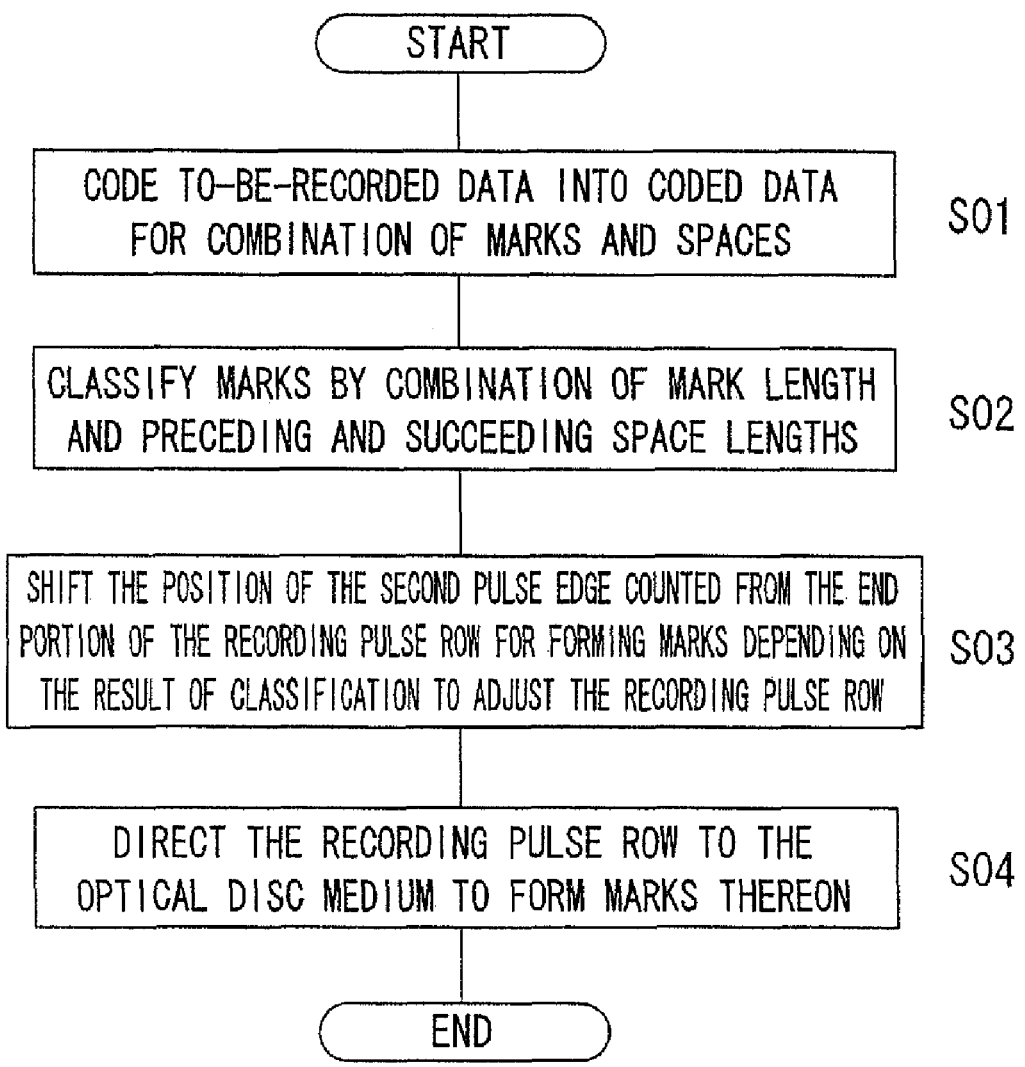
FIG. 7 is a flow chart in the optical recording method according to the first embodiment of the present invention.

There will be described a recording compensating method used for the optical recording method, using a flow chart of FIG. 7.

(a) First, to-be-recorded data is coded to create coded data consisting of a combination of marks and spaces (S01). This coded data corresponds to the recording code row 126 in FIG. 2B.

(b) The marks are classified by combinations of the mark length and the preceding or succeeding space lengths (S02). In FIG. 2E, a 2 T-mark is represented as "2-2-3", a 3 T-mark is represented as "3-3-4", a 5 T-mark is represented as "4-5-2", and a 6 T-mark is represented as "2-6-2". They are represented as a combination of "the preceding space length", "the mark length" and "the succeeding space length", which are arranged in this order.

(c) The position of the second pulse edge counted from the end portion of the recording pulse train for forming marks is shifted depending on the result of classification to adjust the recording pulse train (S03). For example, in FIG. 3C, the position of the second pulse edge counted from the starting end portion is shifted by an amount of edge shift $dT_{F2}$. In FIG. 3D, the position of the second pulse edge counted from the starting end portion is shifted by an amount of edge shift $dT_{F2}$ and/or the position of the second pulse edge counted from the ending end portion is shifted by an amount of edge shift $dT_{E2}$.

(d) The recording pulse train is directed to the optical disc medium 117 to form marks (S04).

Figure 4A:
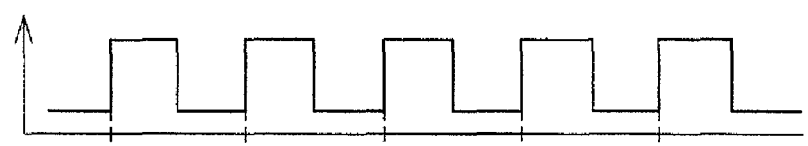
FIGS. 4A to 4D are views illustrating an example of the control of recording pulse trains in the optical recording method according to the first embodiment of the present invention.
Figure 4B:
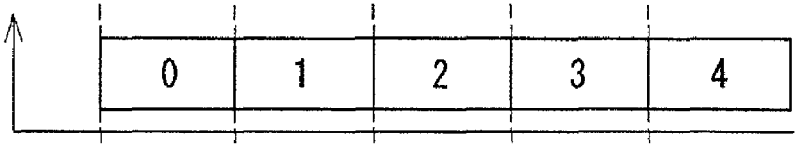
Figure 4C:
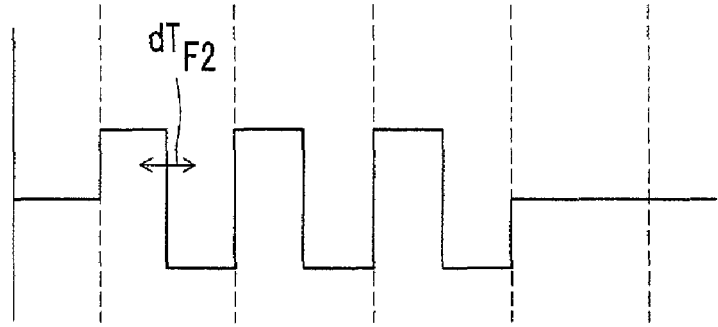
Figure 4D:
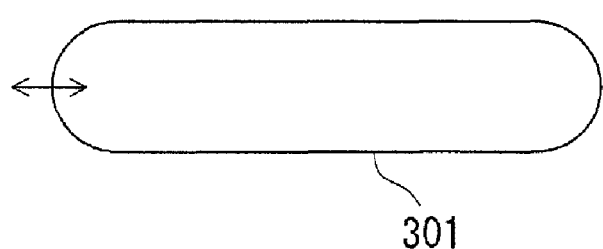

FIGS. 4A to 4D are schematic views illustrating a case of shifting the position of the second pulse edge of a recording pulse train which is counted from the starting end portion thereof by an amount of edge shift $dT_{F2}$, when recording a mark 301 having a mark length of 4 T. FIG. 4A is reference-time signals 128 which serve as a time reference for the recording operation and FIG. 4B is count signals 205 generated from the counter 200. FIG. 4C is a recording pulse train 125 in which the position of the second pulse edge counted from the starting end portion has been shifted by an amount of edge shift $dT_{F2}$. FIG. 4D is a view illustrating an image of a mark 301 having a mark length of 4 T recorded by the recording pulse train of FIG. 4C, wherein there is shown that the starting end position thereof can be accurately controlled. The amount of edge shift $dT_{F2}$ is defined on the basis of the result of classification by mark length and preceding space length of the to-be-recorded mark, as represented in the following Table. 1.

TABLE 1

| $dT_{F2}$ | | The mark length | | |
|---|---|---|---|---|
| | | 2T | 3T | >=4T |
| The preceding space length | 2T | a1 | a2 | a3 |
| | 3T | a4 | a5 | a6 |
| | 4T | a7 | a8 | a9 |
| | >=5T | a10 | a11 | a12 |

As the amount of edge shift $dT_{F2}$, a total of 3*4=12 types of values (a1 to a12) are defined for the mark lengths of to-be-recorded marks which are classified into three types of mark lengths 2 T, 3 T and 4 T and more and for the preceding space lengths classified into four types of spacing lengths 2 T, 3 T, 4 T and 5 T and more. While in this case the amounts of edge shifts $dT_{F2}$ are classified into a total of 12 types for three types of mark lengths and four types of preceding space lengths, the present invention is not limited thereto. For example, a total of 16 types of amounts of edge shifts may be defined for four types of mark lengths similarly. Also, the mark lengths may be classified into two, five or more types of mark lengths and the preceding space lengths may be classified into two, three, five or more types of preceding space lengths. Also, the amount of edge shift $dT_{F2}$ may be defined as absolute time values such as a1=5 nsec or integral multiples of Tw/16 on the basis of the reference-time signals.

As described above, by shifting the position of the second pulse edge of the recording pulse signal which is counted from the starting end portion by an amount of edge shift $dT_{F2}$, the starting end position of the mark can be adjusted more accurately. Further, the pulse edge is adjusted depending on the preceding space length as well as on the mark length of the mark to be recorded, thus adjusting the starting end position of the mark 301 more accurately in consideration of inter-code interference.

Figure 5A:
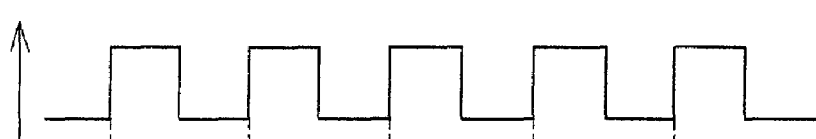
FIGS. 5A to 5D are views illustrating another example of the control of recording pulse trains in the optical recording method according to the first embodiment of the present invention.
Figure 5B:
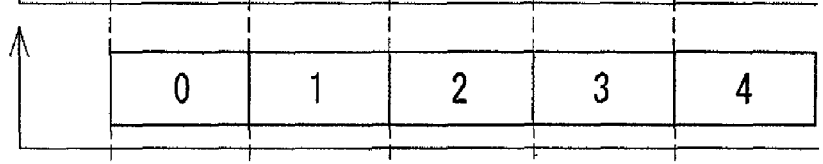
Figure 5C:
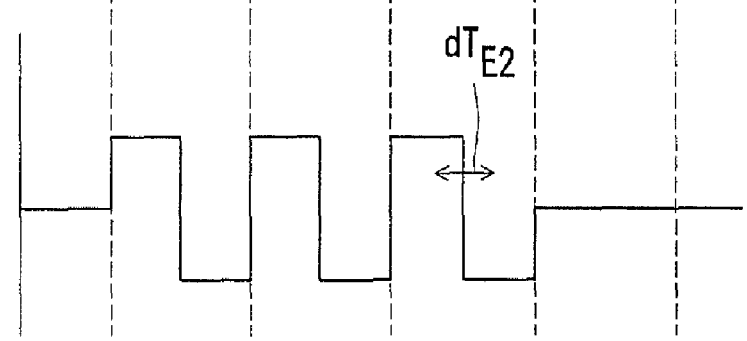
Figure 5D:
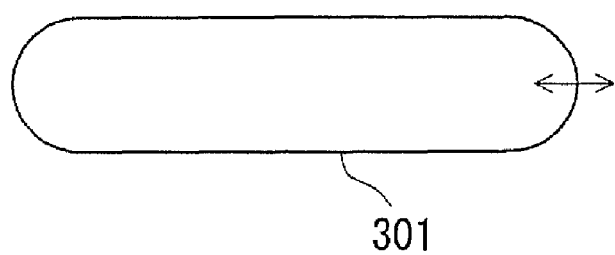

FIGS. 5A to 5D are schematic views illustrating a case of shifting the position of the second pulse edge of a recording pulse train which is counted from the ending end portion thereof by an amount of edge shift $dT_{E2}$, when recording a mark 301 having a mark length of 4 T. FIG. 5A and FIG. 5B are similar to FIG. 4A and FIG. 4B. FIG. 5C is a recording pulse train 125 in which the position of the second pulse edge counted from the ending end portion thereof has been shifted by an amount of edge shift $dT_{E2}$. FIG. 5D is a view illustrating an image of a mark 301 having a mark length 4 T recorded by the recording pulse train of FIG. 5C, wherein there is shown that the position of the ending end portion thereof can be accurately adjusted. The amount of edge shift $dT_{E2}$ is defined on the basis of the result of classification by mark length and succeeding space length of the to-be-recorded mark, as represented in the following Table. 2.

TABLE 2

| $dT_{E2}$ | | The mark length | | |
|---|---|---|---|---|
| | | 2T | 3T | >=4T |
| The succeeding space length | 2T | b1 | b2 | b3 |
| | 3T | b4 | b5 | b6 |
| | 4T | b7 | b8 | b9 |
| | >=5T | b10 | b11 | b12 |

As the amount of edge shift $dT_{E2}$, a total of 3*4=12 types of values (b1 to b12) are defined for the mark lengths of to-be-recorded marks which are classified into three types of mark lengths 2 T, 3 T and 4 T and more and for the succeeding space lengths classified into four types of spacing lengths 2 T, 3 T, 4 T and 5 T and more. While in this case the amounts of edge shifts $dT_{E2}$ are classified into a total of 12 types for three types of mark lengths and four types of succeeding space lengths, the present invention is not limited thereto. For example, a total of 16 types of amounts of edge shifts may be defined for four types of mark lengths similarly. Also, the mark lengths may be classified into two, five or more types of mark lengths and the succeeding space lengths may be classified into two, three, five or more types of succeeding space lengths. Also, the amount of edge shift $dT_{E2}$ may be defined as absolute time values such as b4=6 nsec or integral multiples of Tw/16 on the basis of the reference-time signals.

As described above, by shifting the position of the second pulse edge of the recording pulse signal which is counted from the ending end portion by an amount of edge shift $dT_{E2}$, the ending end position of the mark can be adjusted more accurately. Further, the pulse edge is adjusted depending on the succeeding space length as well as on the mark length of the mark to be recorded, thus adjusting the position of the ending end portion of the mark 301 more accurately in consideration of inter-code interference.

In the recording pulse for a 2 T mark, $dT_{F2}$ and $dT_{E2}$ are coincident at the same pulse edge position as in FIGS. 3A to 3F. There will be described a method for setting the amount of edge shift in the case where two amounts of pulse edge shift are applied to the same pulse edge position as described above. For example, in the case of the arrangement of "3-2-4" for a 2 T mark having a preceding space length of 3 T and a succeeding space length of 4 T in FIG. 2E, "a4" in Table. 1 and "b7" in Table. 2 are selected. In this case, "a4+b7" is defined as $dT_{F2}$ and $dT_{E2}$ for the 2 T mark. By combining as described above, the pulse edge position can be shifted depending on the combination of the preceding space and the succeeding space when two amounts of edge shift are applied to a single pulse edge.

Figure 6A:
FIGS. 6A to 6D are views illustrating a further example of the control of recording pulse trains in the optical recording method according to the first embodiment of the present invention.
Figure 6B:
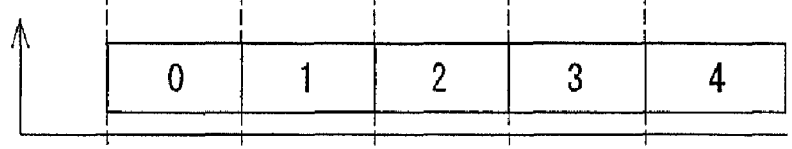
Figure 6C:
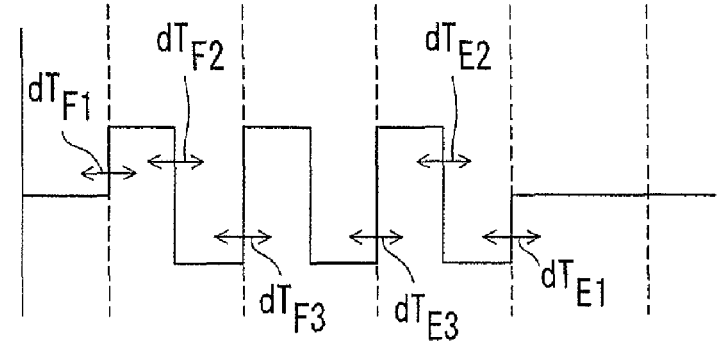
Figure 6D:
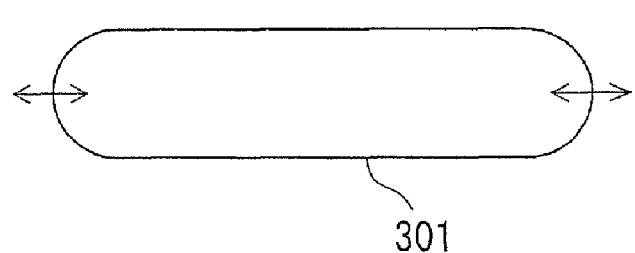

FIGS. 6A to 6D are schematic views illustrating a case of shifting the position of another pulse edge, in addition to shifting the position of the second pulse edge of the recording pulse train which is counted from the starting end portion thereof by an amount of edge shift $dT_{F2}$ (FIG. 4C) and shifting the position of the second pulse edge counted from the ending end portion thereof by an amount of edge shift $dT_{E2}$ (FIG. 5C). FIG. 6A and FIG. 6B are similar to FIG. 4A and FIG. 4B. FIG. 6C is a recording pulse train 125, wherein there are collectively represented a case of shifting the position of the second pulse edge counted from the starting end portion by an amount of edge shift $dT_{F2}$, a case of shifting the position of the second pulse edge counted from the ending end portion by an amount of edge shift $dT_{E2}$, a case of shifting the position of the pulse edge at the starting end portion by an amount of edge shift $dT_{F1}$, a case of shifting the position of the pulse edge at the ending end portion by an amount of edge shift $dT_{E1}$, a case of shifting the position of the third pulse edge counted from the starting end portion by an amount of edge shift $dT_{F3}$, and a case of shifting the position of the third pulse edge counted from the ending end portion by an amount of edge shift $dT_{E3}$. FIG. 6D is a view illustrating an image of a mark 301 having a mark length 4 T recorded by the recording pulse train of FIG. 6C, wherein there is illustrated that the positions of the starting end portion and the ending end portion can be accurately adjusted. The aforementioned amount of edge shift $dT_{F1}$ is defined on the basis of the result of classification of to-be-recorded marks by mark length and preceding space length, as represented in the following Table. 3. The aforementioned amount of edge shift $dT_{E1}$ is defined on the basis of the result of classification of to-be-recorded marks by mark length and succeeding space length, as represented in the following Table. 4. The aforementioned amount of edge shift $dT_{F3}$ is defined on the basis of the result of classification of to-be-recorded marks by mark length and preceding space length, as represented in the following Table. 5. The aforementioned amount of edge shift $dT_{E3}$ is defined on the basis of the result of classification of to-be-recorded marks by mark length and succeeding space length, as represented in the following Table. 6.

TABLE 3

| | | The mark length | | |
|---|---|---|---|---|
| $dT_{F1}$ | | 2T | 3T | >=4T |
| The preceding space length | 2T | c1 | c2 | c3 |
| | 3T | c4 | c5 | c6 |
| | 4T | c7 | c8 | c9 |
| | >=5T | c10 | c11 | c12 |

As the amount of edge shift $dT_{F1}$, a total of 3*4=12 types of values (c1 to c12) are defined for the mark lengths of to-be-recorded marks which are classified into three types of mark lengths 2 T, 3 T and 4 T and more and for the preceding space lengths classified into four types of spacing lengths 2 T, 3 T, 4 T and 5 T and more. While in this case the amounts of edge shifts $dT_H$ are classified into a total of 12 types for three types of mark lengths and four types of preceding space lengths, the present invention is not limited thereto. For example, a total of 16 types of amounts of edge shifts may be defined for four types of mark lengths similarly. Also, the mark lengths may be classified into two, five or more types of mark lengths and the preceding space lengths may be classified into one, two, three, five or more types of preceding space lengths. Also, the amount of edge shift $dT_{F1}$ may be defined as absolute time values such as c6=5 nsec or integral multiples of Tw/16 on the basis of the reference-time signals.

As described above, by shifting the position of the second pulse edge of the recording pulse signal which is counted from the end portion by an amount of edge shift $dT_{F2}$ and/or $dT_{E2}$ and further shifting the position of the pulse edge at the starting end portion by an amount of edge shift $dT_{F1}$, it is possible to adjust the position of the starting end portion of the mark 301 more accurately while adjusting it in somewhat larger units.

TABLE 4

| | | The mark length | | |
|---|---|---|---|---|
| $dT_{E1}$ | | 2T | 3T | >=4T |
| The succeeding space length | 2T | d1 | d2 | d3 |
| | 3T | d4 | d5 | d6 |
| | 4T | d7 | d8 | d9 |
| | >=5T | d10 | d11 | d12 |

As the amount of edge shift $dT_{E1}$, a total of 3*4=12 types of values (d1 to d12) are defined for the mark lengths of to-be-recorded marks which are classified into three types of mark lengths 2 T, 3 T and 4 T and more and for the succeeding space lengths classified into four types of spacing lengths 2 T, 3 T, 4 T and 5 T and more. While in this case the amounts of edge shifts $dT_{E1}$ are classified into a total of 12 types for three types of mark lengths and four types of succeeding space lengths, the present invention is not limited thereto. For example, a total of 16 types of amounts of edge shifts may be defined for four types of mark lengths similarly. Also, the mark lengths may be classified into two, five or more types of mark lengths and the succeeding space lengths may be classified into one, two, three, five or more types of succeeding space lengths. Also, the amount of edge shift $dT_{E1}$ may be defined as absolute time values such as d5=6 nsec or integral multiples of Tw/16 on the basis of the reference-time signals.

As described above, by shifting the position of the second pulse edge of the recording pulse signal which is counted from the end portion by an amount of edge shift $dT_{F2}$ and/or $dT_{E2}$ and further shifting the position of the pulse edge at the ending end portion by an amount of edge shift $dT_{E1}$, it is possible to adjust the position of the ending end portion of the mark 301 more accurately while adjusting it in somewhat larger units.

TABLE 5

| $dT_{F3}$ | | The mark length | |
|---|---|---|---|
| | | 3T | >=4T |
| The preceding space length | 2T | e1 | e2 |
| | 3T | e3 | e4 |
| | 4T | e5 | e6 |
| | >=5T | e7 | e8 |

As the amount of edge shift $dT_{F3}$, a total of 2*4=8 types of values (e1 to e8) are defined for the mark lengths of to-be-recorded marks which are classified into two types of mark lengths 3 T and 4 T and more and for the preceding space lengths classified into four types of spacing lengths 2 T, 3 T, 4 T and 5 T and more. While in this case the amounts of edge shifts $dT_{F3}$ are classified into a total of 8 types for two types of mark lengths and four types of preceding space lengths, the present invention is not limited thereto. For example, a total of 12 types of amounts of edge shifts may be defined for three types of mark lengths 3 T, 4 T and 5 T and more similarly. Also, the mark lengths may be classified into four, five or more types of mark lengths and the preceding space lengths may be classified into one, two, three, five or more types of preceding space lengths. Also, a constant amount of edge shift may be employed. Also, the amount of edge shift $dT_{F3}$ may be defined as absolute time values such as e8=6 nsec or integral multiples of Tw/16 on the basis of the reference-time signals.

TABLE 6

| $dT_{E3}$ | | The mark length | |
|---|---|---|---|
| | | 3T | >=4T |
| The succeeding space length | 2T | f1 | f2 |
| | 3T | f3 | f4 |
| | 4T | f5 | f6 |
| | >=5T | f7 | f8 |

As the amount of edge shift $dT_{E3}$, a total of 2*4=8 types of values (f1 to f8) are defined for the mark lengths of to-be-recorded marks which are classified into two types of mark lengths 3 T and 4 T and more and for the succeeding space lengths classified into four types of spacing lengths 2 T, 3 T, 4 T and 5 T and more. While in this case the amounts of edge shifts $dT_{E3}$ are classified into a total of 8 types for two types of mark lengths and four types of succeeding space lengths, the present invention is not limited thereto. For example, a total of 12 types of amounts of edge shifts may be defined for three types of mark lengths 3 T, 4 T and 5 T and more similarly. Also, the mark lengths may be classified into four, five or more types of mark lengths and the succeeding space lengths may be classified into one, two, three, five or more types of succeeding space lengths. Also, a constant amount of edge shift may be employed. Also, the amount of edge shift $dT_{E3}$ may be defined as absolute time values such as f6=5 nsec or integral multiples of Tw/16 on the basis of the reference-time signals.

Also, the aforementioned amount of edge shift may be simply defined for two types of preceding or succeeding space lengths 2 T and 3 T and more, as in Tables. 7 to 10. In the case of performing high-density recording by directing diaphragmed light to an optical disc, minimum recorded marks and spaces are as small as the light spot, and therefore the signals for shortest marks and shortest spaces may cause inter-code interferences, thus preventing recording or reproduction onto or from accurate edge positions due to the influence of the optical MTF. Therefore, when it is possible to provide sufficient recording characteristics in consideration of inter-code interferences only by classifying the space lengths into 2 T which is the minimum value and the other space lengths, the amounts of edge shifts can be simply classified as previously described to offer the advantage of simplifying the recording compensating table, thereby simplifying the apparatus.

TABLE 7

| $dT_{F2}$ | | The mark length | | | |
|---|---|---|---|---|---|
| | | 2T | 3T | 4T | >=5T |
| The preceding space length | 2T | g1 | g2 | g3 | g4 |
| | >=3T | g5 | g6 | g7 | g8 |

TABLE 8

| $dT_{E2}$ | | The mark length | | | |
|---|---|---|---|---|---|
| | | 2T | 3T | 4T | >=5T |
| The succeeding space length | 2T | h1 | h2 | h3 | h4 |
| | >=3T | h5 | h6 | h7 | h8 |

TABLE 9

| $dT_{F1}$ | | The mark length | | | |
|---|---|---|---|---|---|
| | | 2T | 3T | 4T | >=5T |
| The preceding space length | 2T | i1 | i2 | i3 | i4 |
| | >=3T | i5 | i6 | i7 | i8 |

TABLE 10

| $dT_{E1}$ | | The mark length | | | |
|---|---|---|---|---|---|
| | | 2T | 3T | 4T | >=5T |
| The succeeding space length | 2T | j1 | j2 | j3 | j4 |
| | >=3T | j5 | j6 | j7 | j8 |

Also, as in Tables. 11 to 14, the amount of edge shift may be simply defined such that the amounts of edge shift for the mark length 2 T and the space length 2 T are different from the amounts of edge shifts for mark lengths of 3 T or more and space lengths of 3 T or more. This is advantageous when particularly small inter-code interferences occur in the case of 3 Ts or more (spaces of 3 T or more) and 3 Tm or more (marks of 3 T or more).

TABLE 11

| $dT_{F2}$ | | The mark length | | |
|---|---|---|---|---|
| | | 2T | 3T | >=4T |
| The preceding space length | 2T | k1 | k2 | k3 |
| | 3T | k4 | k5 | k6 |
| | 4T | k7 | | |
| | >=5T | k8 | | |

TABLE 12

| $dT_{E2}$ | | The mark length | | |
|---|---|---|---|---|
| | | 2T | 3T | >=4T |
| The succeeding space length | 2T | l1 | l2 | l3 |
| | 3T | l4 | l5 | l6 |
| | 4T | l7 | | |
| | >=5T | l8 | | |

TABLE 13

| $dT_{F1}$ | | The mark length | | |
|---|---|---|---|---|
| | | 2T | 3T | >=4T |
| The preceding space length | 2T | m1 | m2 | m3 |
| | 3T | m4 | m5 | m6 |
| | 4T | m7 | | |
| | >=5T | m8 | | |

TABLE 14

| $dT_{E1}$ | | The mark length | | |
|---|---|---|---|---|
| | | 2T | 3T | >=4T |
| The succeeding space length | 2T | n1 | n2 | n3 |
| | 3T | n4 | n5 | n6 |
| | 4T | n7 | | |
| | >=5T | n8 | | |

Further, the recording compensating table designating the aforementioned respective amounts of edge shift will be described.

The recording compensating table stored in the recording compensator 118 may be either a recording compensating table provided by reading information which has been pre-recorded on an area of the optical disc 117 which is called a read-in area during the fabrication of the disc or thereafter or a recording compensating table created from the result of learning by actually performing test recording using predetermined recording pulse signals onto a test-writing region on the optical disc 117, reproducing the test-written marks and the spaces and measuring the amounts of edge shifts for determining the condition which can offer the most preferable signal quality.

In the first method, the recording compensating table recording in a predetermined region of the optical disc 117 is obtained as reproducing data and stored in the recording compensator 118.

Figure 8:
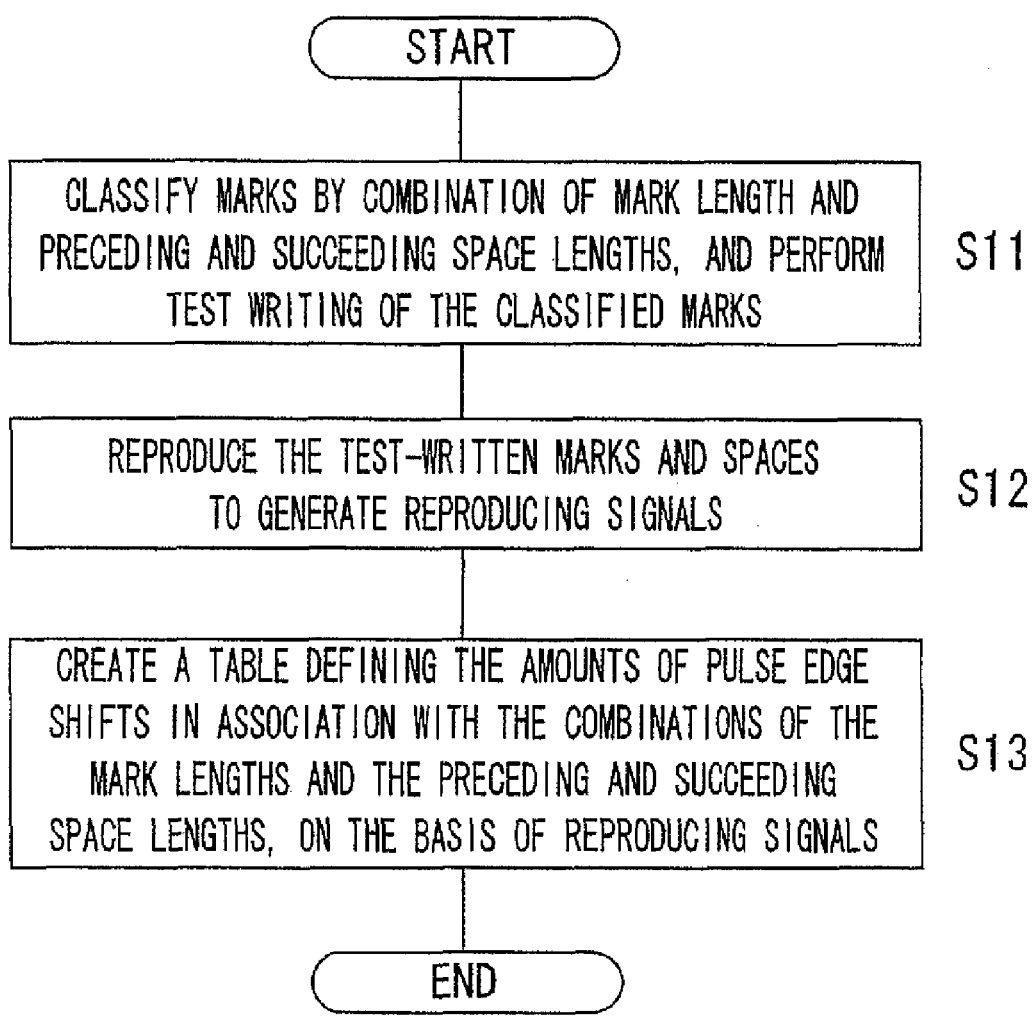
FIG. 8 is a flow chart of a method for creating a recording compensating table, in the optical recording method according to the first embodiment of the present invention.
Figure 9A:
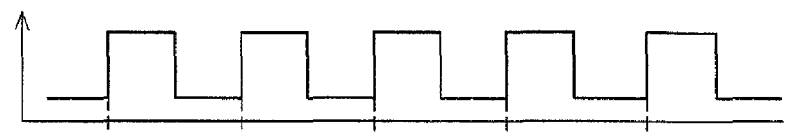
FIGS. 9A to 9F are timing charts illustrating the relationship between the mark lengths and the waveforms of recording pulse trains, in the optical recording method according to a second embodiment of the present invention.
Figure 9B:
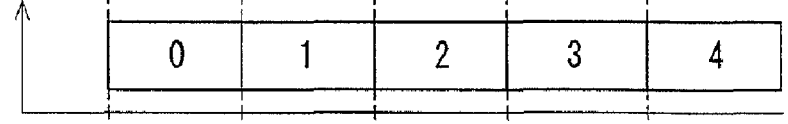
Figure 9C:
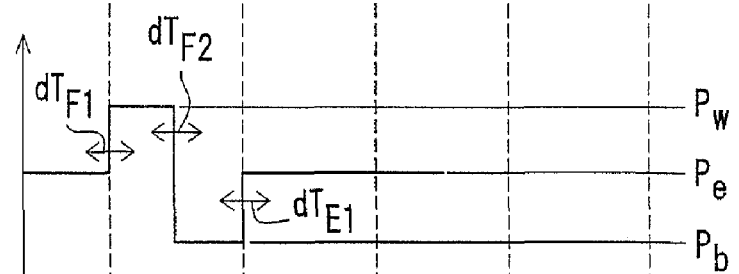
Figure 9D:
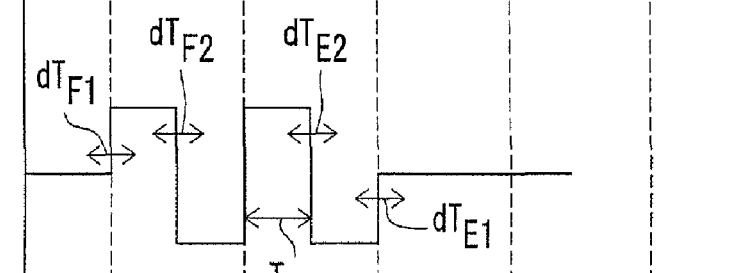
Figure 9E:
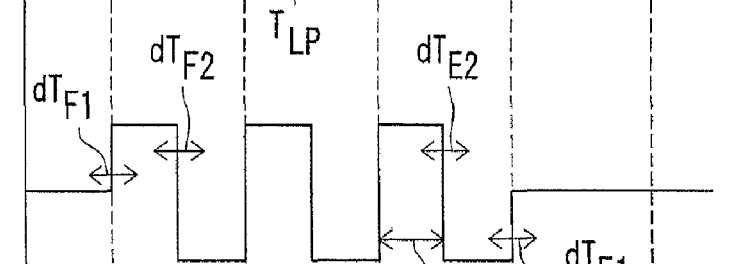
Figure 9F:
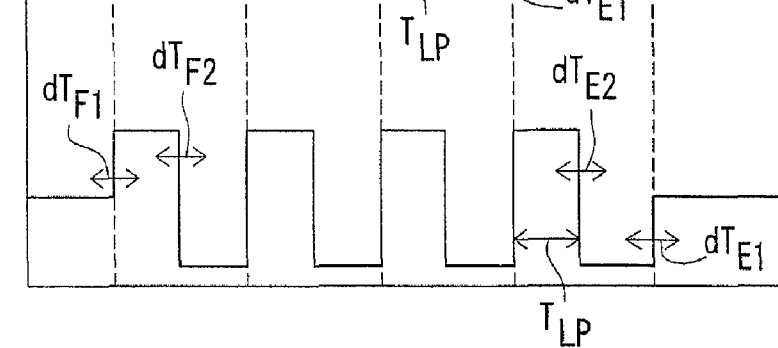
Figure 10A:
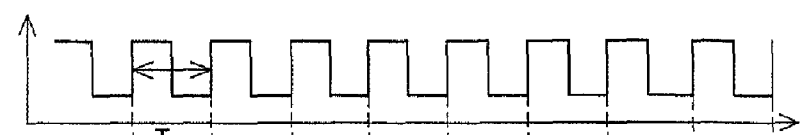
FIGS. 10A to 10J are timing charts illustrating the relationship between the mark lengths and the waveforms of recording pulse trains, in the optical recording method according to a third embodiment of the present invention.
Figure 10B:
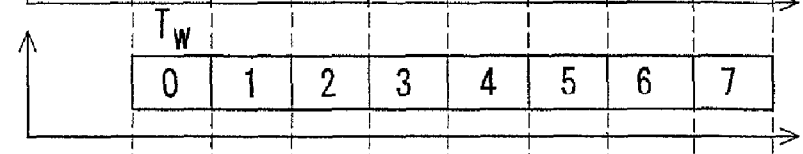
Figure 10C:
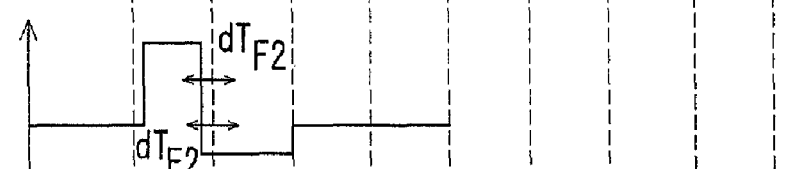
Figure 10D:
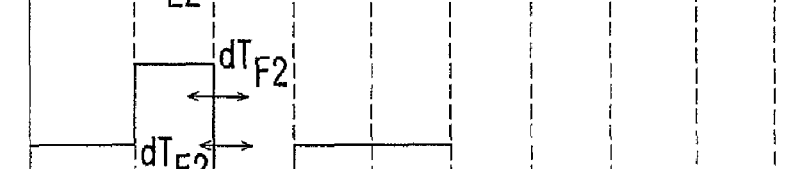
Figure 10E:
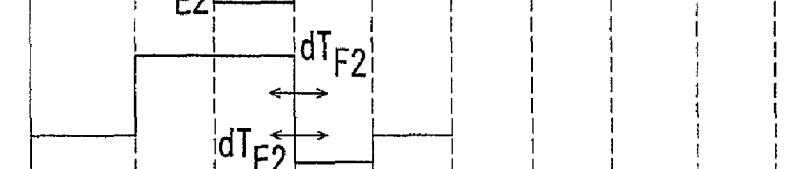
Figure 10F:
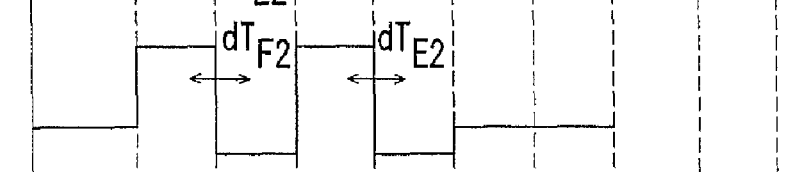
Figure 10G:
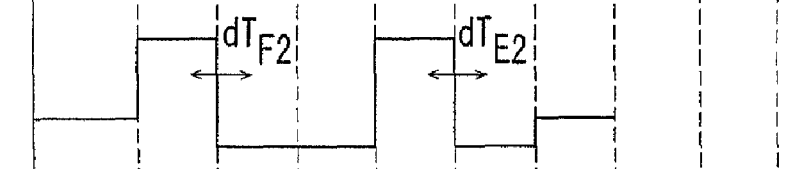
Figure 10H:
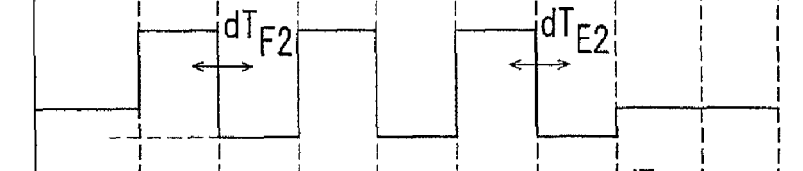
Figure 10I:
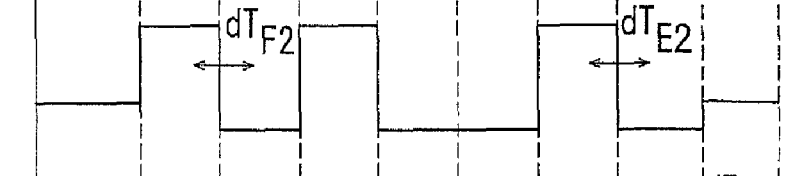
Figure 10J:
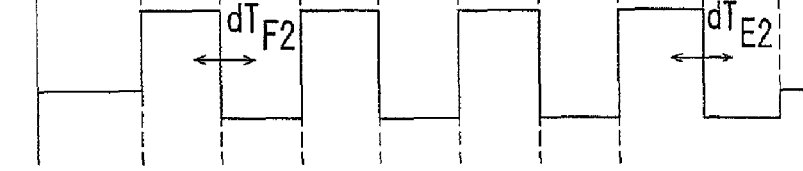
Figure 13A:
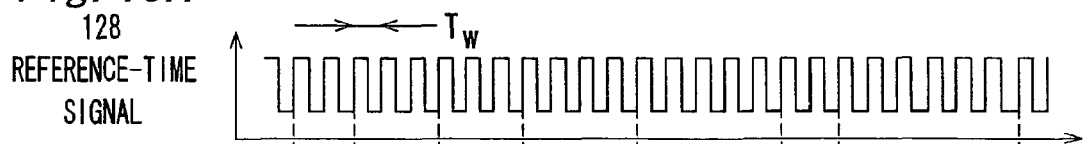
FIGS. 13A to 13D and 13F are timing charts in a prior-art optical recording method.
Figure 13B:
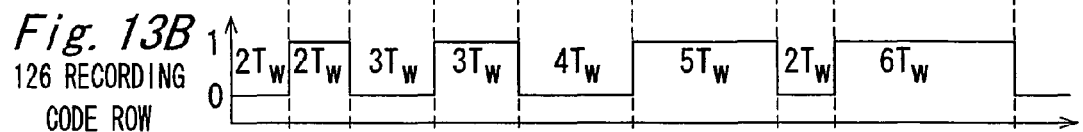
Figure 13C:
Figure 13D:
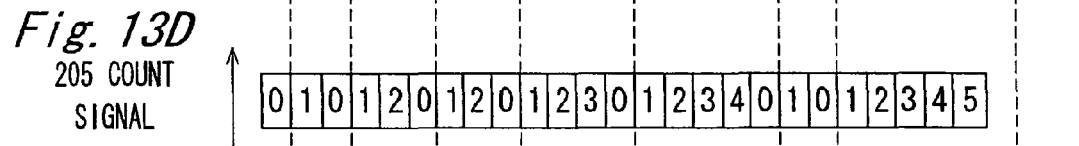
Figure 13F:
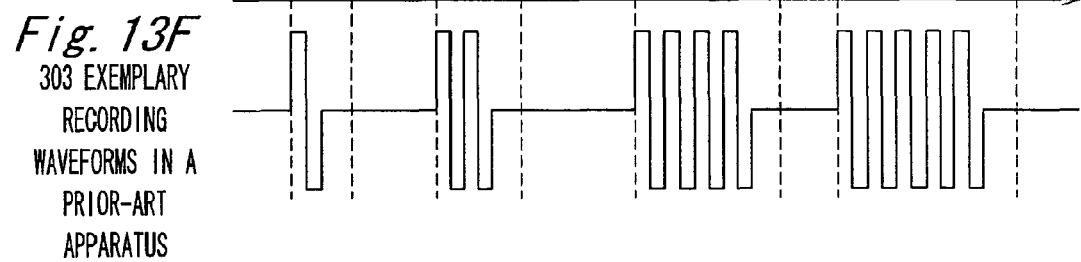
Figure 14A:
FIGS. 14A to 14F are timing charts illustrating the relationship between the mark lengths and the recording waveforms of recording pulse trains, in a prior-art optical recording method.
Figure 14B:
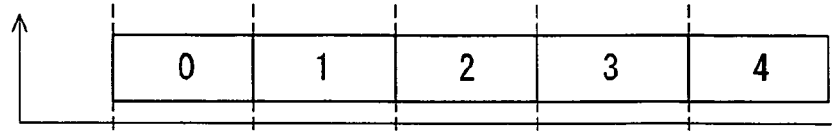
Figure 14C:
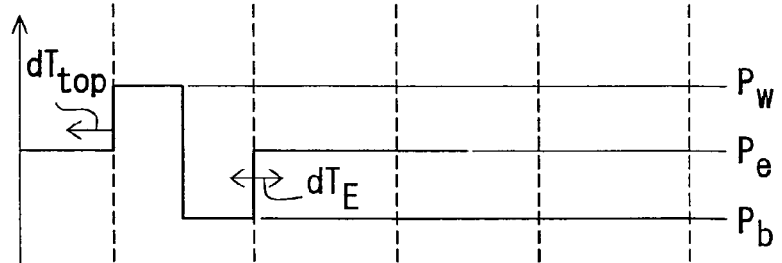
Figure 14D:
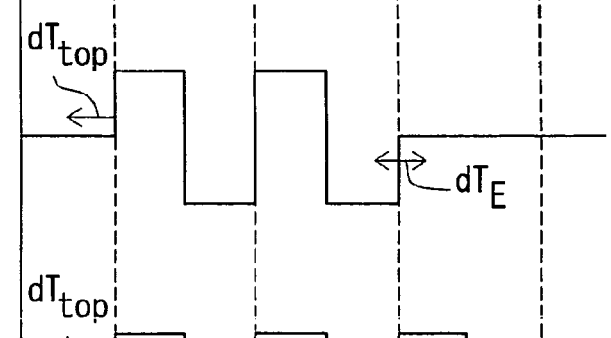
Figure 14E:
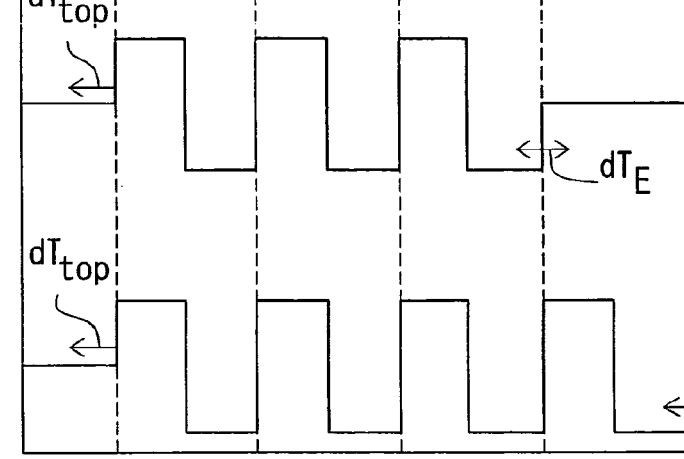
Figure 14F:
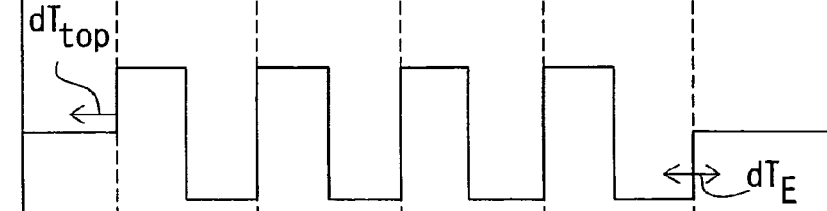

Next, using a flow chart of FIG. 8, there will be described a method for creating a recording compensating table by performing test-writing of a predetermined recording code row onto the optical disc 117, according to the second method.

(a) Marks are classified by the combination of the mark length and the preceding or succeeding space lengths, and the classified marks are test-written (S11).

(b) The test-written marks and spaces are reproduced to generate reproducing signals (S12).

(c) On the basis of the reproducing signals, a table defining the amounts of pulse edge shifts in association with the combinations of the mark lengths and the preceding or succeeding space lengths of the marks is created (S13). The reproducing signals are amplified by the preamplifier 101 to be reproducing signals 120 and then passed through the waveform equalizer 103 and the binarizer 104 to be binarized reproducing signals 121. The resultant binarized reproducing signals 121 are also sent to the reproducing-shift determining device 170. The reproducing-shift determining device 170 makes a comparison between the binarized signals which has been synchronized through a PLL and the binarized signals prior to the synchronization to determine the amounts of shifts for the respective marks and spaces and sends the result of determination to the recording compensator 118.

Further, when test writing is executed using a test-writing region of the optical disc 117 as described above, recording may be repeatedly performed in order to update the recording compensating table data as required on the basis of the determined amount of edge shift, then perform the aforementioned recording operation again and search a recording compensating table which can reduce the PLL clock and the edge shifts in the binarized reproducing signals during reproduction.

(Second Embodiment)

FIG. 9 is a timing chart illustrating the relationship between the mark lengths of marks to be recorded and the recording pulse signals 125, in an optical recording method according to the second embodiment of the present invention. This optical recording method is different from the optical recording method according to the first embodiment in that the width Tlp of the last pulse at the peak power level (Pw) is adjusted in accordance with the result of classification of marks by mark length and succeeding space length. As the width of the last pulse Tlp, a total of 2*4=8 types of values (o1 to o8) are defined for the mark lengths of to-be-recorded marks which are classified into two types of mark lengths 3 T and 4 T and more and for the preceding space lengths classified into four types of spacing lengths 2 T, 3 T, 4 T and 5 T and more, as represented in the following Table. 15.

TABLE 15

| Tlp | | The mark length | |
|---|---|---|---|
| | | 3T | >=4T |
| The preceding space length | 2T | o1 | o2 |
| | 3T | o3 | o4 |
| | 4T | o5 | o6 |
| | >=5T | o7 | o8 |

By classifying the Tlp for respective succeeding space lengths instead of classifying the $dT_{E1}$ for respective succeeding space lengths as described above, it is possible to accurately adjust the positions of the ending end portions of marks, particularly in the case of rerecordable type recording mediums.

(Third Embodiment)

FIGS. 10A to 10J are timing chart illustrating the relationship between the mark lengths of marks to be recorded and the recording pulse signals 125, in an optical recording method according to the third embodiment of the present invention. This optical recording method is different from the optical recording method according to the first embodiment in that the recording pulse signals 125 have waveforms in which the number of middle pulses is not proportional to the mark length value. According to the optical recording method, as illustrated in FIGS. 10C to 10J, the recording pulse signals for marks having mark lengths of 2 Tw, 3 Tw and 4 Tw have a single pulse at the peak power level. The recording pulse signals 125 for marks having mark lengths of 5 Tw and 6 Tw have two pulses at the peak power level. The recording pulse signals 125 for marks having mark lengths of 7 Tw and 8 Tw have three pulses at the peak power level. The recording pulse signal 125 for a mark having a mark length of 9 Tw has four pulses at the peak power level.

Further, when recording can be performed onto a signal recording medium at different recording rates, both recording pulse signals of FIGS. 3A to 3F and recording pulse signals of FIG. 10 can be used by switching therebetween depending on the recording transfer rate. For example, recording pulse signals of FIGS. 3A to 3F may be used for recording at low recording transfer rates while recording pulse signals of FIGS. 10A to 10J may be used for recording at high recording transfer rates.

While the pulses at the peak power level have a width of about 1 Tw and the pulses at the bottom power level have a width of about 1 Tw in the recording pulse signals of FIGS. 10A to 10J, it is desirable that the pulses for respective mark lengths have widths of 0.5 Tw or more after the aforementioned recording compensation. In this case, response speed of the laser hardly influences the recording pulse signals, thus relaxing the recording condition.

According to the optical disc recording method according to the present embodiment, with the aforementioned series of operations, the positions and the widths of the first and last pulses included in recording pulses can be changed as required, for the positions of the starting end portions and the ending end portions of the marks, depending on the mark lengths and the preceding or succeeding space lengths of to-be-recorded marks, to reduce inter-code interferences during reproduction, thus providing preferable signal quality.

(Fourth Embodiment)

There will be described a reproducing method using the optical recording/reproducing apparatus according to the present invention. This reproducing method is characterized by a waveform equalization having frequency characteristics illustrated in FIG. 12.

In the reproducing method, marks recorded on the optical disc 117 are read with laser light, and reproducing signals 120 are created using the detecting lens 106, the light detector 100 and the preamplifier 101. The reproducing signals 120 are changed to signals having frequency characteristics which have been corrected by the waveform equalizer 103. Further, the signals are converted into binarized reproducing signals 121 by the binarizer 104 and then subjected to inverse conversion by the decoder 105 to create reproducing data 122.

There will be observed attenuations of optical outputs depending on the frequency. That is, among 2 Tw signals, 3 Tw signals, 4 Tw signals and 8 Tw signals, etc., signals having higher frequencies such as 2 Tw signals will have smaller reproducing amplitudes since such signals are created from smaller marks. Thus, in order to correct such output attenuations, the characteristics of the equalizer is set such that signals having higher frequencies will have greater output amplitudes, in the reproducing method.

FIG. 12 is a view schematically illustrating the frequency characteristics of the waveform equalizer 103 (equalizer), wherein there is represented the amplitude ratio of the output signal to the input signal. In the figure, the horizontal axis represents the signal frequency and schematically represents the frequencies of a 2 Tw signal, a 3 Tw signal, a 4 Tw signal and a 8 Tw signal. The vertical axis logarithmically represents the output amplitude of the waveform equalizer 103. The waveform equalizer 103 may be a high-pass filter, a band-pass filter having a peak at a frequency which is slightly greater than the frequency corresponding to 2 Tw or the combination of them and amplifiers.

Consequently, as for marks and spaces, the smaller the minimum mark length, the greater the difference between the output amplitude of a signal having a high frequency such as a 2 Tw signal and the output amplitude of a signal having a lower frequency such as a 8 Tw signal, namely the inclination of the characteristic curve. This increases the difference between the output amplitude for the frequency of a 4 Tw signal, for example, and the output amplitude for the frequency of a 8 Tw signal.

Therefore, it is desirable to provide characteristics which can prevent peak shifts in the reproducing frequency characteristics and change the noise frequency distribution to improve the SNR (signal-to-noise ratio) of reproducing signals, thus improve the error rate of reproducing signals.

FIGS. 11A to 11D are schematic views illustrating the difference in the reproducing-signal characteristics due to mark shape differences. FIGS. 11A and 11C are schematic views of mark shapes after the formation of recording marks by scanning a light in a direction from left to right. FIGS. 11B and 11D illustrate reproducing signals generated by reading the aforementioned marks with light having an intensity which will not erase the recorded marks, after the formation of the respective mark shapes.

FIG. 11A is a schematic view illustrating a representative mark shape on a rewritable type medium using phase changes. A 2 Tw mark 1001 which is smallest is formed to be a ginkgo-shaped mark. The mark is formed to be a ginkgo-shaped mark since the cooling pulse has recrystallized the mark ending end portion thereof thereafter. FIG. 11B illustrates reproducing signals during reproduction of the mark of FIG. 11A. In the case where a 2 Tw mark and a 2 Tw space are adjacent to each other as in the figure, the reproducing signal amplitude becomes smallest. In this case, 12 is the minimum amplitude.

On the other hand, FIG. 11C is a schematic view illustrating an exemplary mark shapes formed on a rerecordable-type disc using phase changes. In a rerecordable-type disc, marks are formed without causing recrestalization with cooling pulses. Therefore, a 2 Tw mark 1003 may be formed to be a round shape narrower in the widthwise direction than other long marks. When a 2 Tw mark is formed to have a size smaller in the widthwise direction than the sizes of other marks, the minimum amplitude 12 of the reproducing signals of FIG. 11D will be smaller than the minimum amplitude in FIG. 11B since it is affected by MTF, which increases inter-code interferences in the 2 Tw mark, thus causing a reproducing peak shift.

If the peak boost value (Bp) is increased in the reproducing frequency characteristics of the waveform equalizer illustrated in FIG. 12, the amplitudes of reproducing signals will be increased and concurrently noise will be increased. Particularly, if the boost becomes excessive, this will increase noise in frequency ranges higher than the signal-frequency range, thus causing detrimental problem of degradation of the S/N of reproducing signals. Further, under excessive boost conditions, lower-frequency components (4 Tw to 8 Tw) out of signal components will cause large inter-code interferences, thus degrading the reproducing characteristics. Thus, when recording marks such as 2 Tw marks are drawn to be particularly smaller than other marks, inter-code interferences of 2 T marks can be compensated with the recording compensation based on only mark lengths, but inter-code interferences due to spaces are left, thus degrading the characteristics of reproducing signals. Therefore, as previously described in the aforementioned embodiments, the second pulse edge counted from the end portion of the recording pulse signal is shifted by an amount of edge shift $dT_{F2}$ or/and $dT_{E2}$ depending on the mark length and the preceding or succeeding space lengths and further the starting edge and the ending edge of the recording pulse signal are compensated, particularly in consideration of 2 Tw spaces, during recording of marks, to reduce inter-code interferences which have been caused by 2 Tw spaces in particular, thus improving the characteristics of reproducing signals even when the boost value is low.

Further, in the case of recording data onto an optical recording medium such as a rerecordable-type recording medium which enables recording marks thereon as in FIG. 10, the target boost value for recording compensation depends on the compensation accuracy of the recording compensation. For example, in the case of recording compensation with compensation accuracy of about Tw/16, it is desirable that the boost value is increased by about 1 dB to 2 dB during recording. Also, recording may be first performed without space compensation during test writing and, only when the reproducing signal characteristics such as the jitter and the error ratio cannot satisfy reference values, then the recording operation with space compensation may be performed.

Also, first test writing may be performed using a code row created by eliminating signals for a minimum mark length from recording signals, then a recording compensating table for code lengths whose mark lengths are 3 T or more may be created, then second test writing may be performed with a code row including 2 Tw signals, and then a recording compensating table for signals including 2 Tw signals may be created. When the reproducing signal amplitude is extremely small as in FIG. 11D, if the position of the recording mark of a 2 Tw signal is not correct, this may make it difficult to correctly position longer marks and spaces having lengths of 3 Tw or more. In the case of reproducing signals which will cause significant inter-code interferences as previously described, it is possible to record marks having code lengths of 3 Tw or more at first, then perform accurate recording compensation of the edge positions of the marks and spaces having code lengths of 3 Tw or more, subsequently record signals including 2 Tw signals and then accurately compensate the recording positions of the 2 Tw marks and spaces to enable recording more accurately and efficiently, thus improving the reproducing signal quality.

Further, when recording signals for code lengths of 3 Tw or more as previously described, the boost value of the reproducing equalizer may be reduced by 1 dB or 2 dB from that for recording normal recording code rows including 2 Tw signals during recording compensation. In this case, since no 2 Tw signal is included, the reproducing signal amplitude is relatively large and inter-code interferences occur moderately. Therefore, it is possible to record signals involving little edge shifts, by adjusting the edge positions of long marks with a boost value slightly smaller than normal boost values.

Further, while the respective embodiments of the present invention have been described by exemplifying the case of modulating the recording power with three laser power levels, it goes without saying that modulation with four power levels may be performed such that the power level of cooling pulses is different from the bottom power level between middle pulses to offer equivalent effects.

Further, the present invention may be implemented in the following configurations represented as various embodiments. According to a first configuration, an optical recording/reproducing method of the present invention is an optical recording method for directing laser light to an optical disc medium at plural powers by switching thereamong to record information as information about the edge positions of marks and spaces having plural lengths, wherein the laser power is modulated into pulse shapes having three or more values such that a first power is greater than a second power and the second power is greater than a third power, during the formation of recording marks, the marks within a recording code row are classified by referring to the mark lengths (code length) and the preceding or succeeding space lengths, in accordance with a predetermined rule, the width or the starting position of the head pulse within a segment having the first power in the modulated pulses and the width or the ending position of the last pulse within the segment having the first power in the modulated pulses are changed as required depending on the aforementioned classification of the code lengths during recording to change the positions of the starting end portions and the positions of the ending end portions of the recording marks during recording.

According to a second configuration, in the optical recording/reproducing method of the present invention, for the positions of the ending end portions of the aforementioned recording marks, the width or the ending position of the last pulse within a segment having the first power after modulation into the aforementioned pulse shapes are changed as required depending on the mark lengths and the succeeding space lengths of the to-be-recorded marks.

According to a third configuration, in the optical recording/reproducing method of the present invention, for the positions of the starting end portions of the aforementioned recording marks, the width or the starting position of the first pulse having the first power after modulation into the aforementioned pulse shapes are changed as required depending on the mark lengths and the preceding space lengths of the to-be-recorded marks.

According to a fourth configuration, in the optical recording/reproducing method of the present invention, the mark lengths within the recording code row are classified into at least three types of code lengths which are n, n+1, and n+2 and more (n: a positive integer) and the space lengths preceding or succeeding the aforementioned mark lengths within the recording code row are classified into at least two types of code lengths which are n and n+1 and more.

According to a fifth configuration, in the optical recording/reproducing method of the present invention, the mark lengths within the recording code row are classified into at least three types of code lengths which are n, n+1, and n+2 and more and the space lengths preceding or succeeding the aforementioned mark lengths within the recording code row are classified into at least four types of code lengths which are n and n+1, n+2 and n+3 and more.

According to a sixth configuration, in the optical recording/reproducing method of the present invention, the mark lengths within the recording code row are classified into at least three types of code lengths which are n, n+1 and n+2 and more and, for the mark length n within the aforementioned recording code row, the space lengths preceding or succeeding the aforementioned mark length (n) within the recording code row are classified into at least four code lengths which are n, n+1, n+2 and n+3 and more while for the mark lengths n+1 and n+2 and more within the aforementioned recording code row, the space lengths preceding or succeeding the aforementioned mark lengths (n+1 and n+2 and more) within the recording code row are classified into at least two types of code lengths which are n and n+1 and more.

According to a seventh configuration, in the optical recording/reproducing method of the present invention, first test writing is performed by classifying the mark lengths within the recording code row into at least three types of code lengths which are n, n+1 and n+2 and more and second test writing is performed by classifying the space lengths preceding or succeeding the aforementioned mark lengths within the recording code row into at least four types of code lengths which are n, n+1, n+2 and n+3 and more.

According to a eighth configuration, in the optical recording/reproducing method of the present invention, recording is performed with a recording code row including a row of codes having code lengths of n+1 or more during the aforementioned first test writing and recording is performed with a recording code row including a row of codes having code lengths of n or more during the aforementioned second test writing.

According to a ninth configuration, in the optical recording/reproducing method of the present invention, the boost value of the reproducing equalizer for reproduction after the aforementioned second test writing is varied from that for reproduction after the aforementioned first test writing.

According to a tenth configuration, in the optical recording/reproducing method of the present invention, the boost value of the reproducing equalizer for reproduction after the aforementioned second test writing is incremented by about 1 dB from that for reproduction after the aforementioned first test writing.

According to a eleventh configuration, an optical recording/reproducing apparatus includes an optical recording apparatus for directing laser light to an optical disc medium at plural powers by switching thereamong for forming marks having physical characteristics different from those of non-recorded portions, wherein the optical recording apparatus includes laser-driving unit operable to modulate the power of the laser light, coding means for converting information into recording code row, classifying unit operable to classify the marks in accordance with a predetermined rule by referring to the mark lengths (code lengths) and the preceding or succeeding space lengths within the aforementioned recording code row, and recording waveform generator operable to change the width or the starting position of the head pulse within a segment having a first power within the modulated pulses and the width or the ending position of the last pulse within the segment having the first power within the modulated pulses, wherein the starting end positions and the ending end positions of to-be-recorded marks are changed depending on the classification by the aforementioned classifying unit during recording.

According to a twelfth configuration, the optical recording/reproducing apparatus of the present invention includes driving unit operable to drive the laser by changing the width or the ending position of the last pulse within a segment having the first power after modulation into the aforementioned pulse shapes as required depending on the mark lengths and the succeeding space lengths of the to-be-recorded marks, for the positions of the ending end portions of the aforementioned recording marks.

According to a thirteenth configuration, the optical recording/reproducing apparatus of the present invention includes driving unit operable to drive the laser by changing the width or the starting position of the first pulse having the first power after modulation into the aforementioned pulse shapes as required depending on the mark lengths and the preceding space lengths of the to-be-recorded marks, for the positions of the starting end portions of the aforementioned recording marks.

According to a fourteenth configuration, in the optical recording/reproducing apparatus of the present invention, the aforementioned classifying unit classifies the mark lengths within the recording code row into at least three types of code lengths which are n, n+1, and n+2 and more (n: a positive integer) and classifies the space lengths preceding or succeeding the aforementioned mark lengths within the recording code row into at least two types of code lengths which are n and n+1 or more.

According to a fifteenth configuration, in the optical recording/reproducing apparatus of the present invention, the aforementioned classifying unit classifies the mark lengths within the recording code row into at least three types of code lengths which are n, n+1, and n+2 or more and classifies the space lengths preceding or succeeding the aforementioned mark lengths within the recording code row into at least four types of code lengths which are n and n+1, n+2 and n+3 and more.

According to a sixteenth configuration, in the optical recording/reproducing method of the present invention, the aforementioned classifying unit classifies the mark lengths within the recording code row into at least three types of code lengths which are n, n+1 and n+2 and more and classifies the space lengths preceding or succeeding the aforementioned mark length (n) within the recording code row into at least four code lengths which are n, n+1, n+2 and n+3 and more for the code length n within the aforementioned recording code row while classifying the space lengths preceding or succeeding the aforementioned mark lengths (n+1 and n+2 and more) within the recording code row into at least two types of code lengths which are n and n+1 and more, for the mark lengths n+1 and n+2 and more within the aforementioned recording code row.

According to a seventeenth configuration, in the optical recording/reproducing apparatus of the present invention, first test writing is performed by classifying the mark lengths within the recording code row into at least three types of code lengths which are n, n+1 and n+2 and more and second test writing is performed by classifying the space lengths preceding or succeeding the aforementioned mark lengths within the recording code row into at least four types of code lengths which are n, n+1, n+2 and n+3 and more.

According to a eighteenth configuration, in the optical recording/reproducing apparatus of the present invention, recording is performed with a recording code row including a row of codes having code lengths of n+1 and more during the aforementioned first test writing and recording is performed with a recording code row including a row of codes having code lengths of n or more during the aforementioned second test writing.

According to a nineteenth configuration, in the optical recording/reproducing apparatus of the present invention, the boost value of the reproducing equalizer for reproduction after the aforementioned second test writing is varied from that for reproduction after the aforementioned first test writing.

According to a twentieth configuration, in the optical recording/reproducing apparatus of the present invention, the boost value of the reproducing equalizer for reproduction after the aforementioned second test writing is incremented by about 1 dB from that for reproduction after the aforementioned first test writing.

The optical recording method and the optical recording apparatus of the present invention are applicable to industries of electrical appliances including digital electrical household appliances and information processing apparatuses.

The invention claimed is:

1. An optical recording method for directing a recording pulse train to an optical disc medium to form marks and spaces thereon and for recording information as information about edge positions of the marks and the spaces between the marks, the recording pulse train having been created by modulating laser light into plural power levels, the method comprising:
   coding to-be-recorded data into coded data consisting of a combination of the marks and the spaces;
   when the mark to be formed has a minimum mark length and when the recording pulse train for forming the mark having the minimum mark length has a single pulse with a peak power level, shifting a position of the second pulse edge counted from a starting edge of the recording pulse train for forming the marks and the spaces, depending on the result of the classifying the marks each having a minimum mark length on the basis of the minimum mark length and a space length of a preceding space and a succeeding space, to adjust the recording pulse train; and
   directing the recording pulse train to the optical disc medium to form the marks and the spaces thereon.

2. An optical disc medium including a recording region for recording data by a method for directing a recording pulse train to the optical disc medium to form marks and spaces thereon and for recording information as information about the edge positions of the marks and the spaces between the marks, the recording pulse train having been created by modulating laser light into plural power levels, the method comprising:
   coding to-be-recorded data into coded data consisting of a combination of the marks and the spaces;
   when the mark to be formed has a minimum mark length and when the recording pulse train for forming the mark having the minimum mark length has a single pulse with a peak power level, shifting a position of the second pulse edge counted from a starting edge of the recording pulse train for forming the marks and the spaces, depending on the result of the classifying the marks each having a minimum mark length on the basis of the minimum mark length and a space length of a preceding space and a succeeding space, to adjust the recording pulse train; and
   directing the recording pulse train to the optical disc medium to form the marks and the spaces thereon.

3. Playbacking method for playbacking the optical disc medium as claimed in claim 2, wherein the method comprises:
   directing second laser light to the optical disc medium, the second laser light having a laser power that is less than the power of the laser light used at the time of forming the marks and the spaces; and
   obtaining the information about the edge positions of the marks and the spaces between the marks by receiving the second laser light reflected from the optical disc medium, to playback the data recorded on the optical disc medium on the basis of the information about the edge positions of the marks and the spaces between the marks.

* * * * *